US012789533B2

(12) United States Patent
Stanich et al.

(10) Patent No.: US 12,789,533 B2
(45) **Date of Patent: *Nov. 10, 2026**

(54) PRINT ARTIFACT COMPENSATION MECHANISM

(71) Applicants: Mikel Stanich, Boulder, CO (US); Walter F. Kailey, Boulder, CO (US)

(72) Inventors: Mikel Stanich, Boulder, CO (US); Walter F. Kailey, Boulder, CO (US)

(73) Assignee: RICOH COMPANY, LTD., Tokyo (JP)

( * ) Notice: Subject to any disclaimer, the term of this patent is extended or adjusted under 35 U.S.C. 154(b) by 349 days.

This patent is subject to a terminal disclaimer.

(21) Appl. No.: 18/607,142

(22) Filed: Mar. 15, 2024

(65) Prior Publication Data

US 2025/0289239 A1 Sep. 18, 2025

(51) Int. Cl.
*B41J 2/21* (2006.01)
*B41J 2/205* (2006.01)

(52) U.S. Cl.
CPC ............. *B41J 2/2139* (2013.01); *B41J 2/205* (2013.01); *B41J 2/2146* (2013.01); *B41J 2202/13* (2013.01)

(58) Field of Classification Search
CPC ...... B41J 2/2139; B41J 2/205; B41J 2202/13; B41J 2/2146
See application file for complete search history.

(56) References Cited

U.S. PATENT DOCUMENTS 7,673,958 B2 3/2010 Heiles et al.
8,842,330 B1 9/2014 Enge
9,108,402 B2 8/2015 Sudo et al.
9,361,559 B2 6/2016 Shibata
11,368,592 B1 6/2022 Kailey et al.
11,636,296 B1 * 4/2023 Stanich .............. G06K 15/1878 358/1.1
11,734,537 B1 8/2023 Stanich et al.
(Continued)

FOREIGN PATENT DOCUMENTS

EP 1634709 A1 3/2006
EP 4056373 A1 9/2022

OTHER PUBLICATIONS

Bolton, I., "Compensating for blocked or deviated nozzles", Global Graphics Software Blog, 5 pages, Apr. 22, 2021.
(Continued)

*Primary Examiner* — Yaovi M Ameh
(74) *Attorney, Agent, or Firm* — Jaffery Watson Hamilton & DeSanctis LLP

(57) ABSTRACT

A system is disclosed. The system includes at least one physical memory device to store compensation logic and one or more processors coupled with the at least one physical memory device to execute the compensation logic to generate first and second sets of inverse transfer functions to compensate for a gap region, wherein each set of inverse transfer functions is generated for a corresponding group of overlapping pel forming elements based on ink deposition functions associated with the corresponding group and a joint target response, wherein the gap region is located between overlapping pel forming elements of the corresponding groups and generate compensated halftones based on the first and second sets of inverse transfer functions.

20 Claims, 29 Drawing Sheets

(56) References Cited

U.S. PATENT DOCUMENTS

| | | | |
|---|---|---|---|
| 11,900,189 | B1 | 2/2024 | Zhang et al. |
| 2005/0259296 | A1 | 11/2005 | Faken et al. |
| 2019/0255861 | A1 | 8/2019 | Hauck et al. |
| 2020/0274991 | A1 | 8/2020 | Stanich et al. |
| 2021/0339522 | A1 | 11/2021 | Shibata |
| 2022/0219463 | A1 | 7/2022 | Steenkamer et al. |
| 2023/0283736 | A1 | 9/2023 | Stanich et al. |
| 2025/0292046 | A1 * | 9/2025 | Stanich ................ G06K 15/027 |

OTHER PUBLICATIONS

Notice of Allowance for U.S. Appl. No. 18/607,136 mailed Jan. 13, 2026, 8 pages.
Office Action for U.S. Appl. No. 18/607,104 mailed Mar. 24, 2026, 28 pages.
Office Action for U.S. Appl. No. 18/607,122 mailed Mar. 30, 26, 11 pages.

* cited by examiner

PRINT ARTIFACT COMPENSATION MECHANISM

FIELD OF THE INVENTION

The invention relates to the field of image reproduction, and in particular, to uniformity compensation.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

SUMMARY

In one embodiment, a system is disclosed. The system includes at least one physical memory device to store compensation logic and one or more processors coupled with the at least one physical memory device to execute the compensation logic to generate first and second sets of inverse transfer functions to compensate for a gap region, wherein each set of inverse transfer functions is generated for a corresponding group of overlapping pel forming elements based on ink deposition functions associated with the corresponding group and a joint target response, wherein the gap region is located between overlapping pel forming elements of the corresponding groups and generate compensated halftones based on the first and second sets of inverse transfer functions.

BRIEF DESCRIPTION OF THE DRAWINGS

A better understanding of the present invention can be obtained from the following detailed description in conjunction with the following drawings, in which.

DETAILED DESCRIPTION

Prior to commencing printing operations, compensation may be performed to compensate for measured response differences for a printhead nozzle which is not jetting properly. Compensation methods are based on uniformity compensation of nozzles. As used herein, uniformity compensation is defined as a calibration to compensate for measured response differences at a single pel, by a pel forming element (e.g., print head nozzle) in comparison to a target response. However, various nozzles may become defective which may lead to undesired changes (e.g., artifacts) in jetting output such as voids or banding. For example, some nozzles may be subject to jet-outs, while others may be affected by an overlap error between printheads.

Current uniformity compensation relies on multiple process iterations to compensate for a nozzle that is not jetting properly. Having to perform multiple iterations of compensation is an inefficient process as it takes up time and requires more printing of test patterns. Further still, conventional methods may be unable to compensate (e.g., correct) the artifacts sufficiently even when complete.

According to one embodiment, a print artifact compensation mechanism to perform nozzle compensation for jet-outs and/or printhead overlap is described which result in the technical benefit of improved print output which mitigates the impact of the print artifacts. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
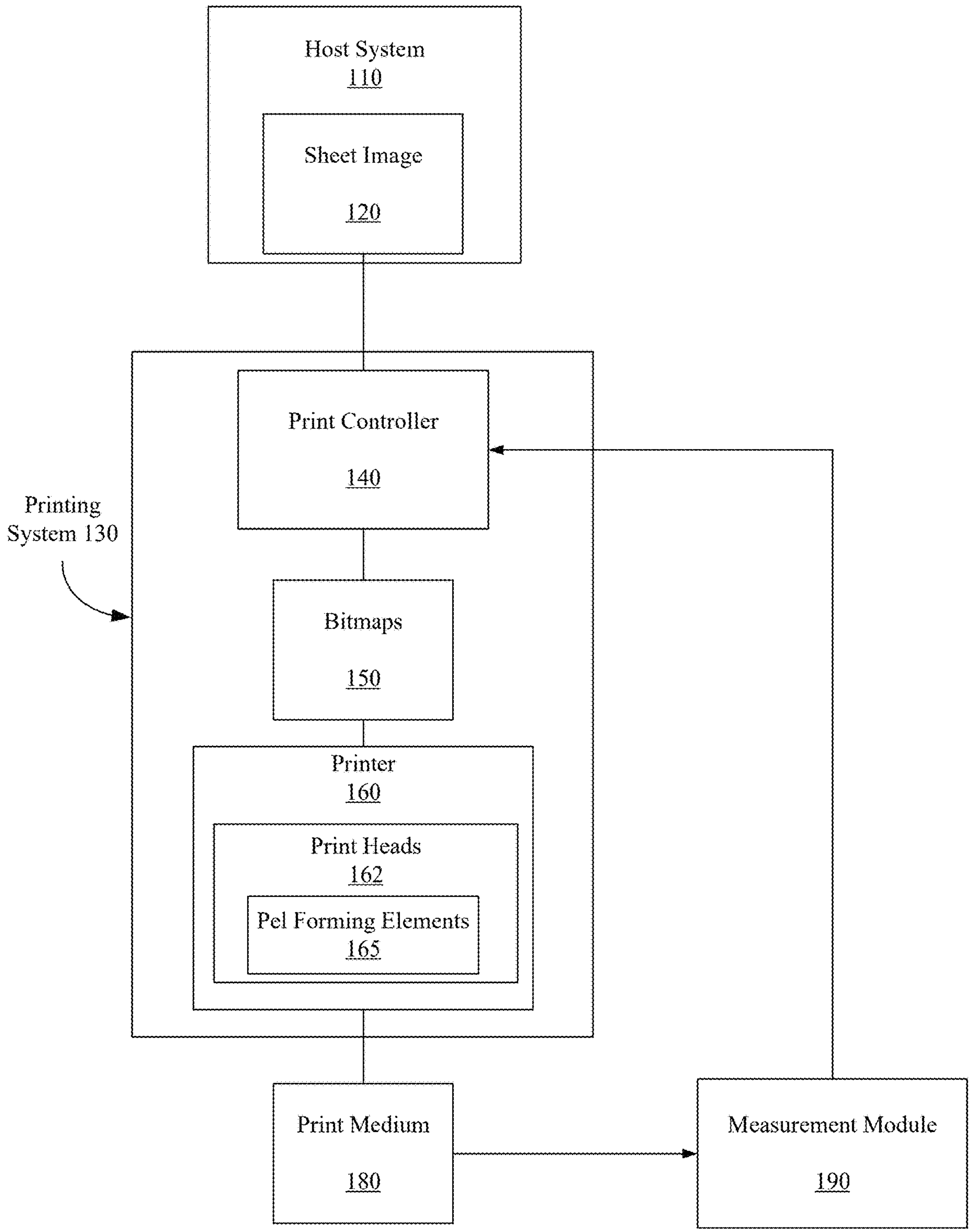
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., one or more print engines that apply the print images to the print medium according to bitmaps 150). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more printheads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser).

According to one embodiment, pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. In a further embodiment, pel forming elements 165 may be assigned to one of one or more color planes that correspond to types of marking materials (e.g., Cyan, Magenta, Yellow, and black (CMYK)). These types of marking materials may be referred to as primary colors.

Printer 160 may be a multi-pass printer (e.g., dual pass, 3 pass, 4 pass, etc.) wherein multiple sets of pel forming elements 165 print the same region of the print image on the print medium 180. In such an embodiment, the set of pel forming elements 165 may be located on the same physical structure (e.g., an array of nozzles on an ink jet printhead 162) or separate physical structures. The resulting print medium 180 may be printed in color and/or in any of a number of gray shades, including black and white (e.g., Cyan, Magenta, Yellow, and black, (CMYK), expanded color gamut (Cyan, Magenta, Yellow, black, Orange, Green and Violet, (CMYKOGV) and secondary colors (e.g., Red, Green and Blue), obtained using a combination of two primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 contains the instructions (e.g., ink drop size and/or location) for the one or more printheads 162 and pel forming elements 165. Bitmap 150 may be a halftoned bitmap (e.g., a compensated halftone bit map generated from compensated halftones, or un-compensated halftone bit map generated from un-compensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a compensation system to obtain measurements of the system response (e.g., measurements of the printed medium 180). The measured results are communicated to print controller 140 to be used in a compensation process. The measurement system may be a stand-alone process or be integrated into the printing system 130.

According to one embodiment, measurement module 190 may be a sensor to take optical measurements of printed images on print medium 180. Measurement module 190 may generate and transmit measurement data. Measurement data may be OD (e.g., optical density), perceptual lightness (e.g., L* in the CIELAB color plane L*a*b*) and/or scanned image (e.g., RGB) data corresponding to a printed image. In one embodiment, measurement module 190 may comprise one or more sensors that individually or in total take measurements for printed markings produced for some or all pel forming elements 165. In another embodiment, measurement module 190 may be comprised of a camera system, in-line scanner, densitometer, or spectrophotometer.

In a further embodiment, measurement data may include map information to correlate portions of the measurement data (e.g., OD data) to the corresponding pel forming elements 165 that contributed to the portions of the measurement data. In another embodiment, the print instructions for a test pattern (e.g., step chart) provides the correlation of the portions of the measurement data to the corresponding pel forming elements that contributed to the portions of the measurement data.

Figure 2A:
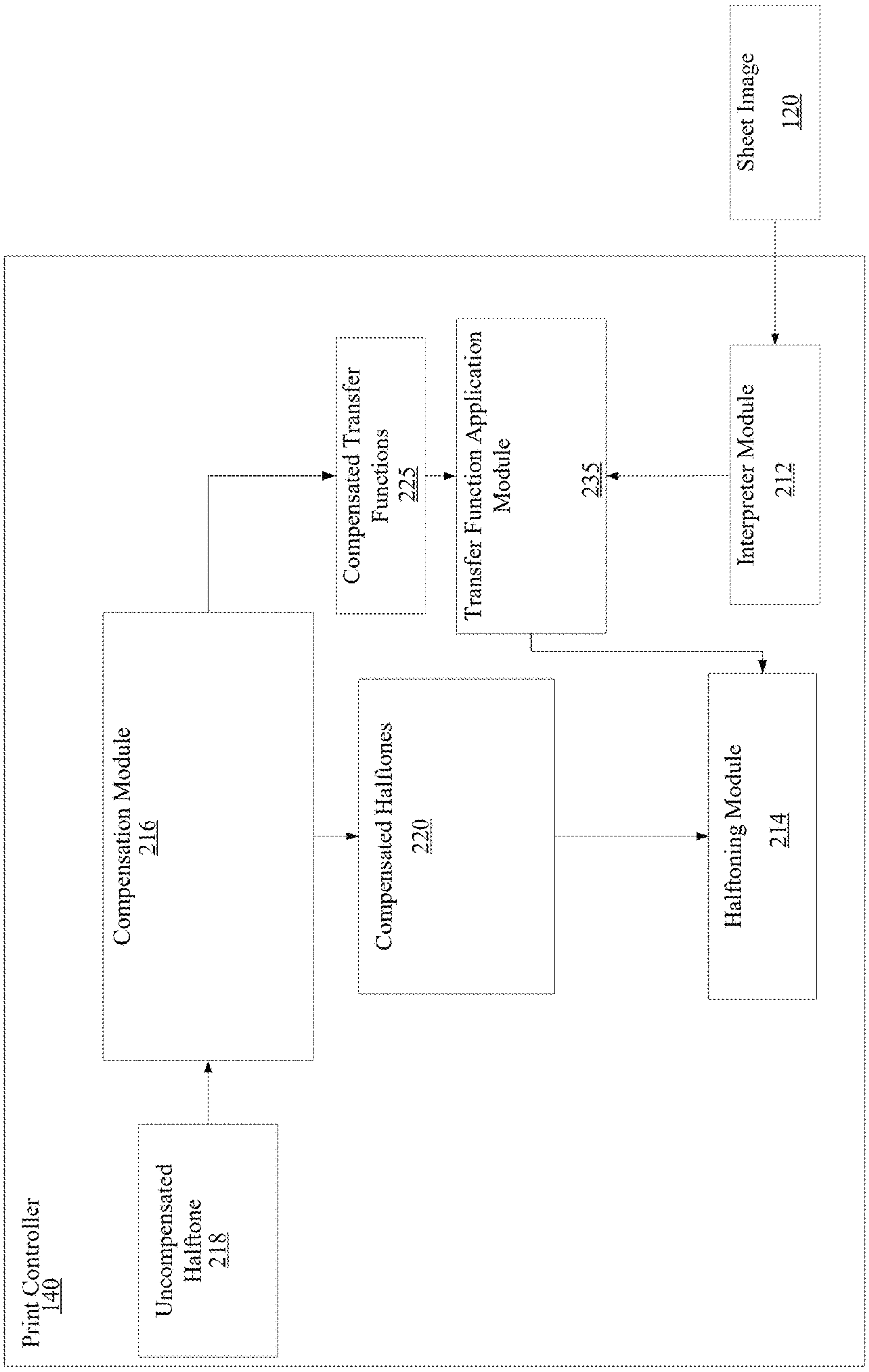
FIGS. 2A & 2B illustrate embodiments of block diagrams of a print controller.
Figure 2B:
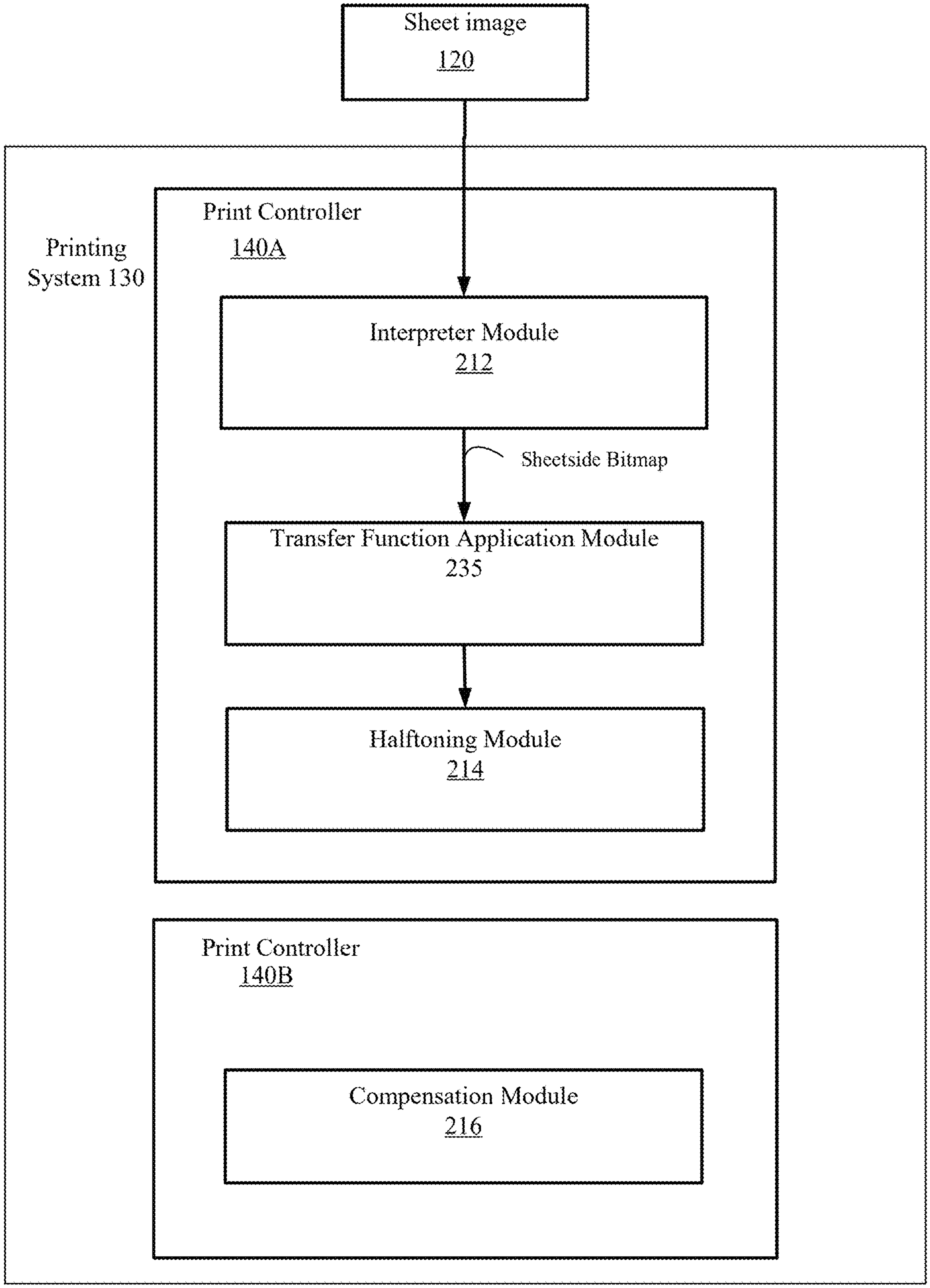

FIG. 2A illustrates a print controller 140 (e.g., DFE or digital front end), in its generalized form, including interpreter module 212, halftoning module 214 and compensation module 216. These separate components may represent hardware used to implement the print controller 140. Alternatively, or additionally, the separate components may represent logical blocks implemented by executing software instructions in a processor of the printer controller 140. FIG. 2B illustrates an alternative embodiment having print controllers 140A & 140B. In this embodiment, print controller 140A includes interpreter module 212 and halftoning module 214, and print controller 140B includes compensation module 216. Print controllers 140A and 140B may be implemented in the same printing system 130 (as shown) or may be implemented separately.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data (e.g., contone data) as a part of the image processing prior to printing. In that case, the contone image data (CTI) is transformed (e.g., compensated) by the transfer functions prior to halftoning.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger instructed drop sizes, beginning with zero and ending with a maximum drop size (e.g., none, small, medium and or large). The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. This set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the pel values in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

Compensation module 216 performs a compensation process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones. In such an embodiment, measurements of the system response are received via measurement module 190 using the un-compensated halftone 218 for printing the system response.

Compensation module 216 may alternatively perform a compensation process to generate compensated transfer functions 225 based on the measurement data and target data. In such an embodiment, measurements of the system response are received via measurement module 190 using compensated halftone 220 to obtain the measured printing system response. Compensated transfer functions 225 are then received at transfer function application module 235, which applies the received compensation transfer functions 225 to print image data received from interpreter module 212 prior to performing halftoning at halftoning module 214. In one embodiment, a transfer function comprises a mapping of an input digital count (or tint) to an output digital count for a system, where digital count is the gray level or color value representing the pels in a bitmap 150 (FIG. 1). Transfer functions may be received or generated by print controller 140.

According to one embodiment, compensation module 216 may also be implemented to perform compensation for defective pel forming elements 165. In such an embodiment, defective pel forming elements 165 may result from jet-outs and/or incorrect printhead overlap.

Jet-Out Compensation

Figure 3A:
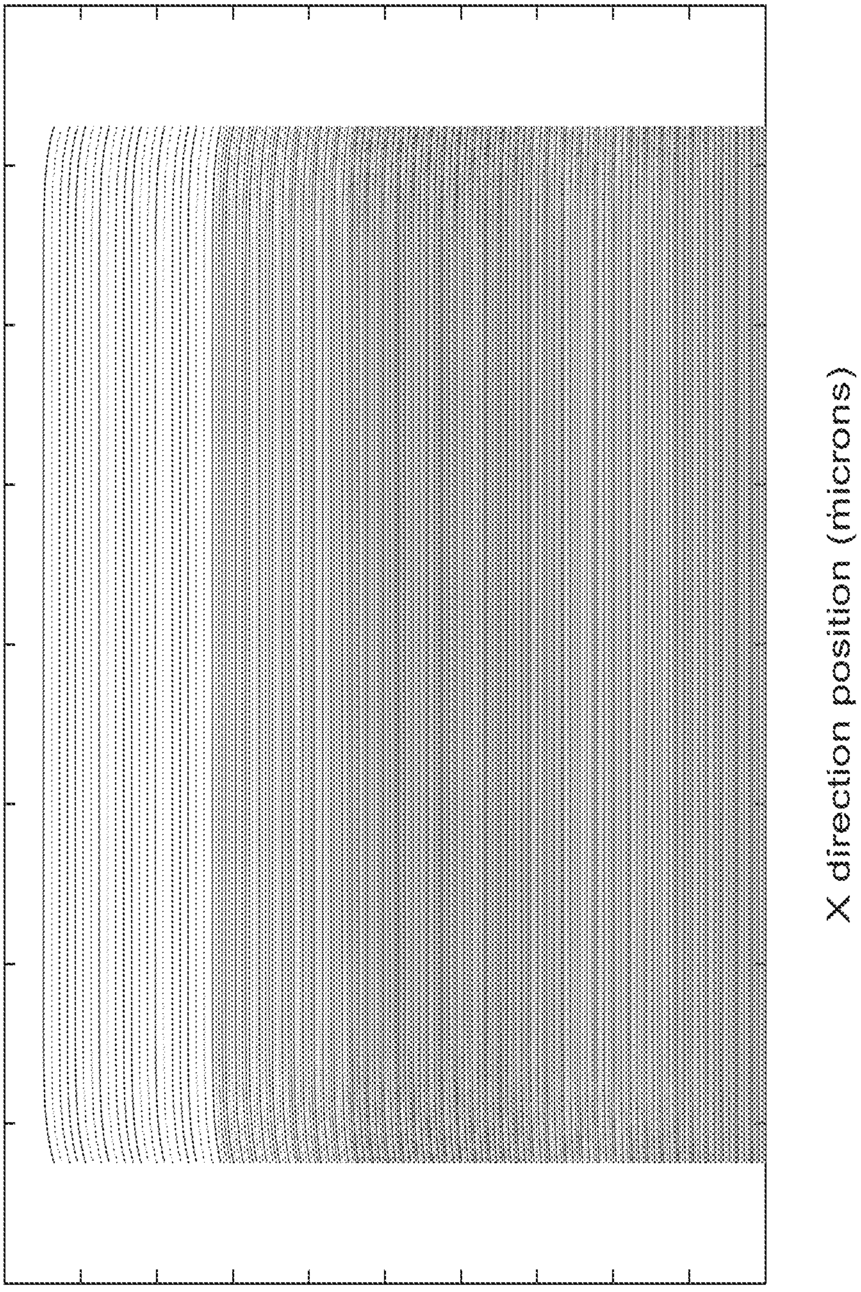
FIGS. 3A & 3B are graphs illustrating ink deposition.
Figure 3B:
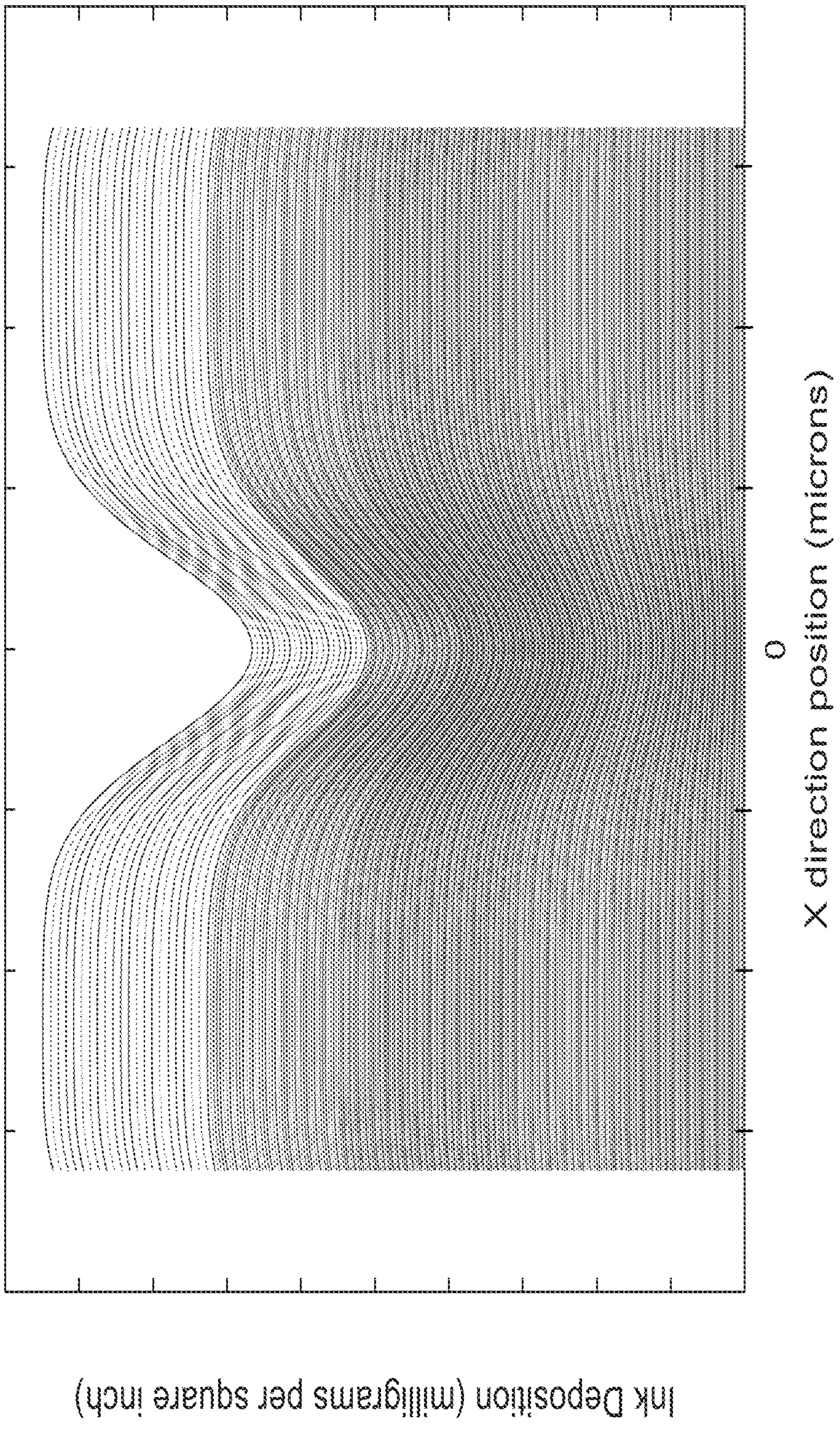
Figure 4:
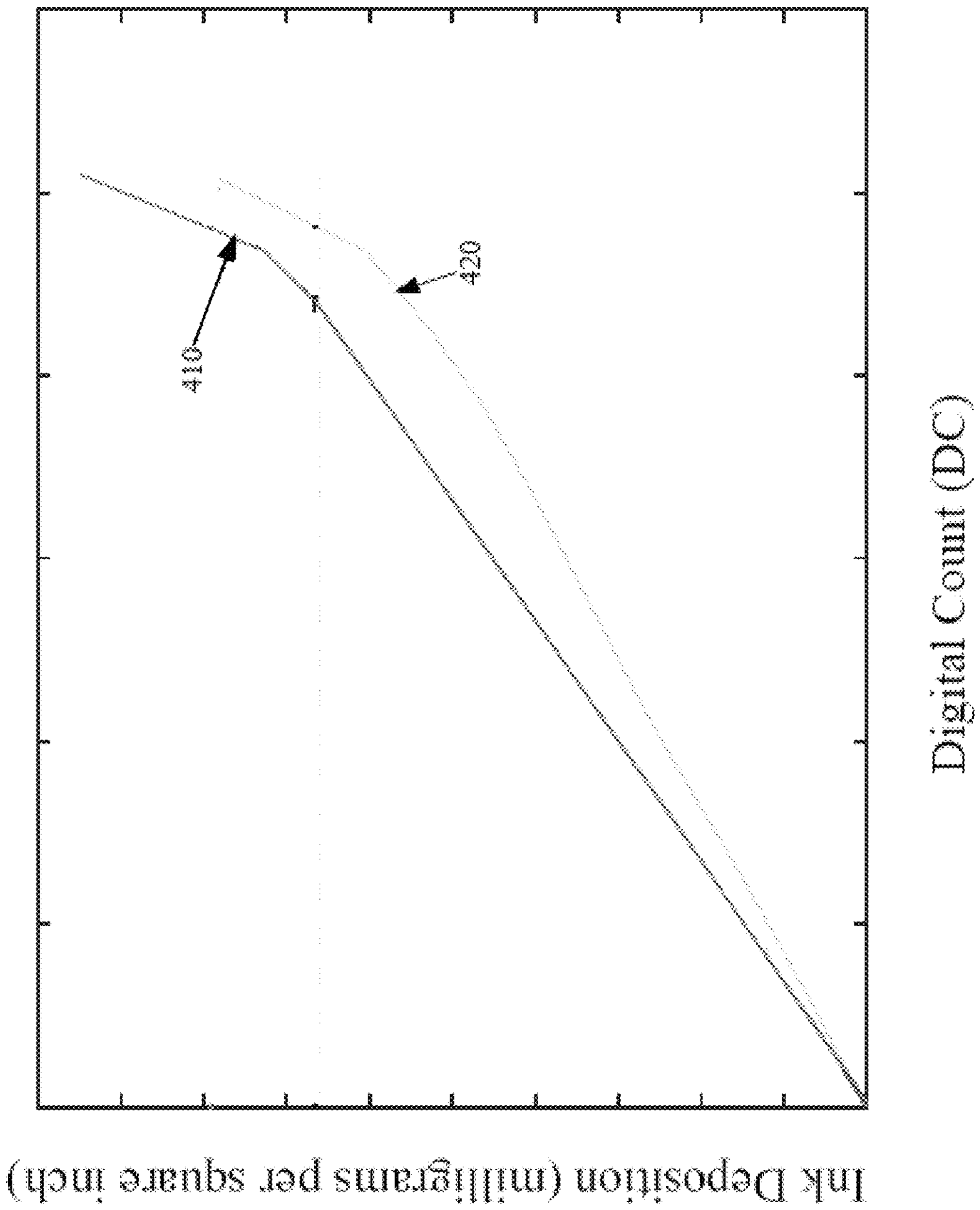
FIG. 4 is a graph illustrating ink deposition vs digital count without compensation.

A jet-out is a print defect (e.g., pel forming element artifact) caused by a completely blocked ink jet nozzle and the result is no ink deposited on the print medium when the blocked ink jet nozzle is instructed to fire. Alternately a jet-out may be a print defect caused by a partially blocked (e.g., deviated jet) or intermittently jetting nozzle having the result of significantly reduced or unreliable ink deposited on the print medium when the defective ink jet nozzle is instructed to fire. Other failure mechanisms may exist to cause a jet-out that exhibits the same resulting lack of ejected drop or unreliable jetting. FIG. 3A is a graph illustrating ink deposition without a jet-out. while FIG. 3B is a graph illustrating simulated jet-out ink deposition without compensation. The graphs show ink deposition (e.g., ink volume or mass deposited within a unit area) versus the X direction position for an array of ink jet nozzles. A family of ink deposition curves is shown for different digital counts (DC). The X direction is typically defined as across the print medium web (e.g., in the direction of the nozzles in the array, orthogonal to the direction of print medium travel) for a production printer. As shown in FIG. 3B, an ink deposition deficiency ("valley") is apparent at the x=0 position where a pel forming element 165 is not depositing ink. Similarly, FIG. 4 is a graph illustrating ink deposition at location x=0 vs digital count for an array of nozzles without jet-out compensation, and including lines 410 and 420. These lines are evaluated at the same X position and include the ink deposition contributions from adjacent nozzles in the array of nozzles. Line 410 indicates a target ink deposition (e.g., ink deposition without any jet-outs in the array of nozzles). Line 420 indicates ink deposition associated with a jet-out nozzle at x=0 and shows the ink deposition contributions from the adjacent nozzles in the array of nozzles with all of the adjacent nozzles functioning (e.g., none of the adjacent nozzles have jet-out conditions).

According to one embodiment, compensation module 216 is implemented to perform uniformity compensation to compensate jet-outs at pel forming elements 165. In such an embodiment, compensation module 216 generates transfer functions for each of a plurality of color planes (e.g., CMYK) to compensate for non-functioning (e.g., jet-out) pel forming element 165. As a result, the transfer functions are generated based on ink deposition functions (e.g., representations of ink volume or mass deposited in a unit area versus input digital count) for groups of pel forming elements including functioning pel forming elements. Further, ink deposition functions comprise a function of a pel forming element position (e.g., x direction position) and the input digital count.

In a further embodiment, compensation module 216 generates a first set and second set of transfer functions to compensate for one or more non-functioning pel forming elements 165, wherein each set of transfer functions is generated for a corresponding group of pel forming elements 165 based on ink deposition functions associated with the corresponding group and a joint target response, wherein the non-functioning pel forming element is located between functioning pel forming elements (e.g., physically located between the x-direction positions of the functioning pel forming elements) of the corresponding groups. In such an embodiment, compensation module 216 generates the first and second sets of transfer functions by generating the first set of transfer functions (e.g., TF1) based on first ink deposition functions (e.g., IDLGJO1) and third ink deposition functions (e.g., IDLG) and generating the second set of transfer functions (e.g., TF2) based on second ink deposition functions (e.g., IDLGJO2) and the third ink deposition functions; wherein the first ink deposition functions correspond to a first local group of pel forming elements including first functioning pel forming elements, the second ink deposition functions correspond to a second local group of pel forming elements including second functioning pel forming elements, the third ink deposition functions correspond to the joint target response. The first local group refers to functioning pel forming elements 165 adjacent to (e.g., bordering, neighboring, etc.) the non-functioning pel forming element 165. The second local group refers to functioning pel forming elements 165 adjacent to the first local group. In other words, the first local group includes the functioning pel forming elements 165 that are one pel away (left and right in the x-direction) from the non-functioning pel forming element 165. Second local group includes functioning pel forming elements 165 that are two pels away (left and right in the x-direction) from the non-functioning pel forming element 165. The first local group and second local group have no functioning pel forming elements 165 in common.

In an alternative embodiment, compensation module 216 may generate compensated halftones 220. In such an embodiment, compensation module 216 generates first and second sets of inverse transfer functions (e.g., ITF1 and ITF2) to compensate for a non-functioning pel forming element, wherein each set of inverse transfer functions is generated for a corresponding group of functioning pel forming elements 165 based on ink deposition functions associated with the corresponding group and a joint target response. In a further embodiment, the non-functioning pel forming element is located between functioning pel forming elements of the corresponding groups.

Compensation module 216 also generates compensated halftones based on the first and second sets of inverse transfer functions. In this embodiment, the derived ITFs are used to transform (e.g., modify, compensate) the thresholds of a halftone threshold array, adjacent to (e.g., in the positional vicinity of) the jet-out nozzle location which are associated with the columns of threshold data associated with IDLGJO1 and IDLGJO2. In a further embodiment, compensation module 216 generates the compensated halftones by applying the first and second sets of inverse transfer functions to an uncompensated halftone design to modify halftone thresholds of the uncompensated halftone design. In such an embodiment, generating the first and the second sets of inverse transfer functions comprises generating the first set of inverse transfer functions based on first ink deposition functions (e.g., IDLGJO1) and third ink deposition functions (e.g., IDLG) and generating the second set of inverse transfer functions based on second ink deposition functions (e.g., IDLGJO2) and the third ink deposition functions.

In this instance, the first ink deposition functions correspond to a first local group of pel forming elements including first functioning pel forming elements, the second ink deposition functions correspond to a second local group of pel forming elements including second functioning pel forming elements, and the third ink deposition functions correspond to the joint target response. The first local group refers to functioning pel forming elements 165 adjacent to (e.g., bordering, neighboring, etc.) the non-functioning pel forming element 165. The second local group refers to functioning pel forming elements 165 adjacent to the first local group. In other words, the first local group includes the functioning pel forming elements 165 that are one pel away (left and right in the x-direction) from the non-functioning pel forming element 165. Second local group includes functioning pel forming elements 165 that are two pels away (left and right in the x-direction) from the non-functioning pel forming element 165. The first local group and second local group have no functioning pel forming elements 165 in common.

In such an embodiment, the halftone thresholds (e.g., original halftone thresholds, unmodified halftone thresholds, uncompensated halftone thresholds) are modified by the ITFs such that the output ink amounts in the vicinity of the jet-out defect corresponding to modified halftone thresholds (e.g., compensated halftone thresholds) with the pel forming element artifacts and the output ink amounts corresponding to un-modified halftone thresholds without the pel forming element artifacts are substantially equal for a range of the input digital counts. In other words, the ITFs are generated such that when they are applied to modify the halftone thresholds, the output ink amounts corresponding to modified halftone thresholds with the pel forming element artifacts present and the output ink amounts corresponding to un-modified halftone thresholds without the pel forming element artifacts present are substantially equal for a range of the input digital counts.

Figure 5:
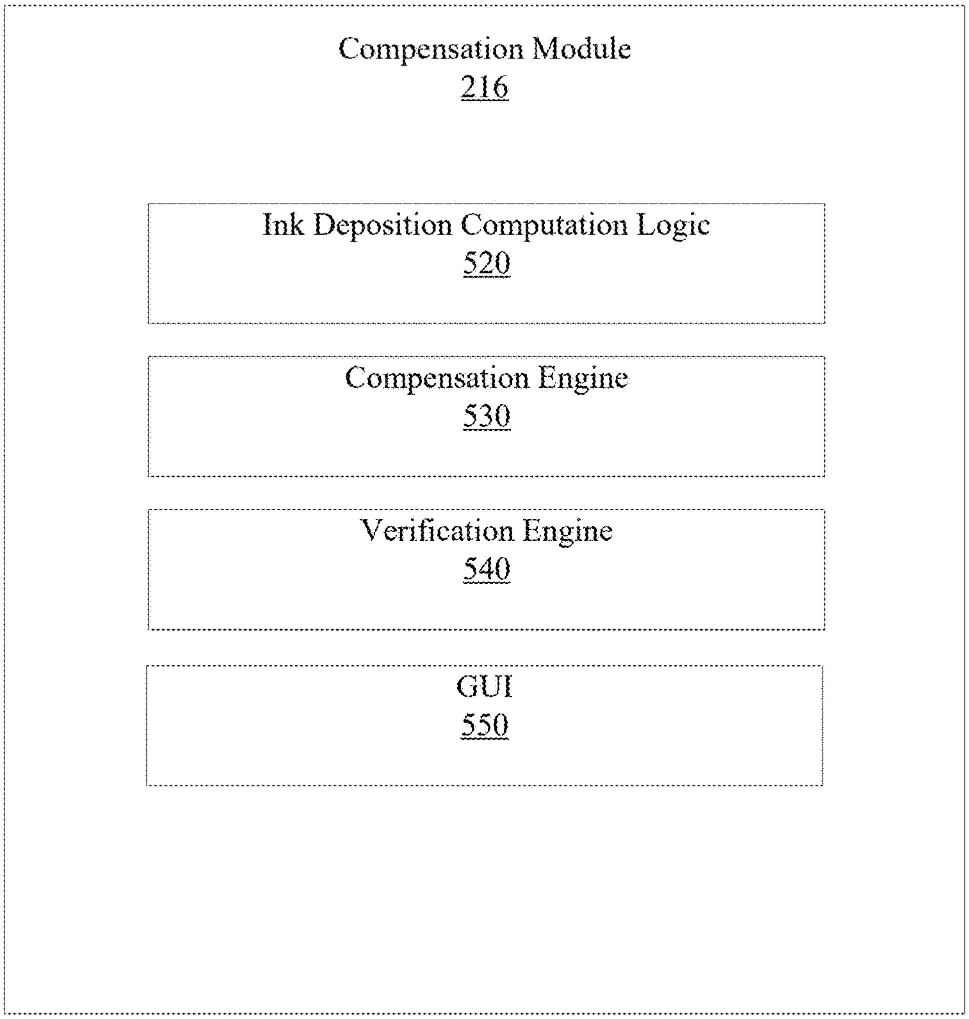
FIG. 5 illustrates one embodiment of a compensation module.

FIG. 5 illustrates one embodiment of compensation module 216. As shown in FIG. 5, compensation module 216 includes ink deposition computation logic 520. According to one embodiment, ink deposition computation logic 520 generates the IDLGJO1 and IDLGJO2 based on a contone digital count levels (DC).

Figure 6:
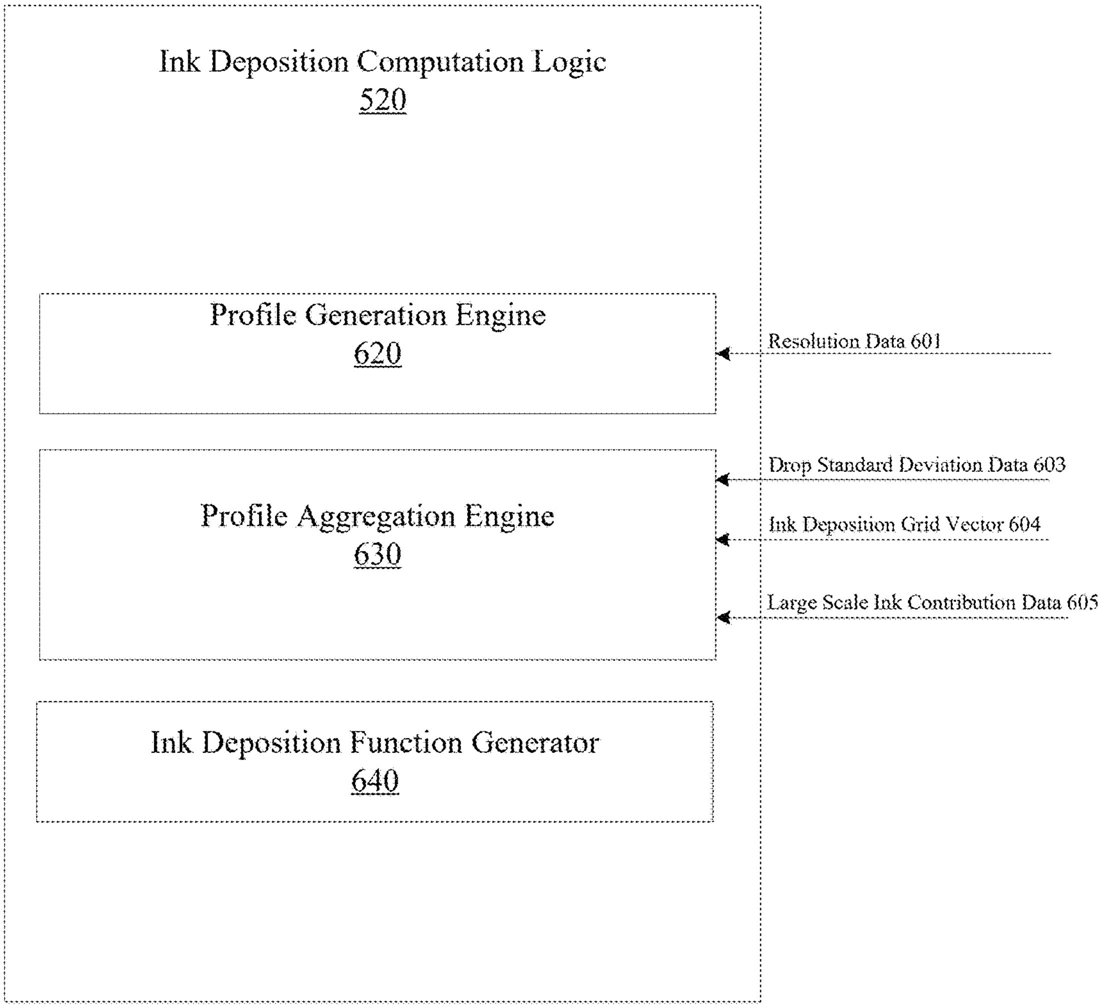
FIG. 6 illustrates one embodiment of ink deposition computation logic.

FIG. 6 illustrates one embodiment of ink deposition computation logic 520. As shown in FIG. 6, ink deposition computation logic 520 includes profile generation engine 620, profile aggregation engine 630 and ink deposition function generator 640. Profile generation engine 620 generates Gaussian shaped ink deposition profiles associated with each ink deposition function. Gaussian shaped ink deposition profiles describe the ink deposition in the horizontal direction X along the ink jet array. Additionally, Gaussian shaped ink deposition profiles have a one-to-one correspondence to each pel element. As discussed above, ink deposition is separated into multiple components. Thus, profile aggregation engine 630 generates Gaussian shaped ink deposition profiles, which are combined (e.g., added together) to obtain the ink deposition functions (e.g., the local group components IDLGJO1 and IDLGJO2, IDNILG, etc.). A technical benefit for using ink deposition data to determine compensation includes the ability to model the aggregate ink contributions associated with groups of member pel forming elements 165 (whether the members of the group are functioning or non-functioning) at a given location (e.g., an X direction position) since the location of each member is accounted for. Further, employing ink deposition for uniformity compensation has a resulting technical benefit of enabling computationally efficient methods.

In a further embodiment, ink deposition computation logic 520 generates a steady state ink deposition function (IDNILG) at a location distant to the non-functioning pel forming element 165 for pel forming elements 165 that are not in either local group (NILG). Thus, IDNILG is the ink deposition function corresponding to a group of pel forming elements 165 (e.g., NILG) that are outside of the domain of the elements to be considered to be modified. A resulting technical benefit of employing NILG is that it may be used as a factor (as explained further below) to calibrate the uniformity for groups receiving the compensation (e.g., the local groups) with other groups that do not receive the compensation (e.g., NILG):

$$\text{IDtotal\_}X(x,\text{DC})=\text{IDNILG\_}X(x,\text{DC})+\text{IDLG\_}X(x,\text{DC})+\text{IDLGJO0\_}X(x,(\text{DC}))=\text{IDNILG\_}X(x,\text{DC})+\text{IDLGJO1\_}X(x,\text{TF1\_}X(\text{DC}))+\text{IDLGJO2\_}X(x,\text{TF2\_}X(\text{DC}))+\text{IDLGJO0\_}X(x,(\text{DC}))$$

Subtracting IDNILG+IDLGJO0_$X$($x$, (DC)) results in:

$$\text{IDtotal\_}X(x,\text{DC})-(\text{IDNILG\_}X(x,\text{DC})+\text{IDLGJO0\_}X(x,(\text{DC})))=\text{IDLG\_}X(x,\text{DC})=\text{IDLGJO1\_}X(x,\text{TF1\_}X(\text{DC}))+\text{IDLGJO2\_}X(x,\text{TF2\_}X(\text{DC}))$$

As shown, IDLG is the sum of IDLGJO1 and IDLGJO2 with TF1 and TF2 applied. According to this equation and as explained further below, TF1 and TF2 are determined such that the total ink contributions from the compensated first and second local groups achieve a joint target response (e.g., ink deposition function IDLG). In other words, TF1 and TF2 are generated based on corresponding target response portions (e.g., unequal response portions) that in total are the joint target response. The joint target response comprises an ink deposition function.

According to one embodiment, Gaussian shaped ink deposition profiles associated with the IDLGJO1 and IDLGJO2 groups of pel forming elements 165 are generated based on received data (e.g., via received via GUI 550). IDLGJO0 corresponds to the ink deposition associated with a functioning version of the jet-out pel/nozzle. In this embodiment, the received data includes the number of pel forming elements 165, as well as resolution data 601 for printer 160 and/or pel forming elements 165. The resolution data 601 may be measured in dots per inch (DPI) in a direction (x) or as a physical spacing amount (e.g., the variable 's' as will be explained below), where the "x" dimension represents horizontal position where ink deposition is determined for a set of Gaussian shaped ink deposition profiles representing the individual ink depositions of pel forming elements 165 in the cross-web direction (e.g., along pel forming elements 165). The locations of the pel forming elements 165 may be represented as a printer grid.

The basis for the Gaussian shaped profile model is the ink deposition for a single pel forming element 165. A Gaussian distribution is implemented to model how ink from a pel forming element 165 gradually spreads away from the center and provides a closed form expression for the ink deposition across the single pel forming element 165 for the ink applied to the media. In one embodiment, a one-dimensional Gaussian shaped ink deposition profile is implemented, and the one dimension is the x direction. While a Gaussian shaped ink deposition profile is used in this application, any closed form, convex distribution functions with adjustable amplitude and width parameters could be used to yield technical benefits of accurate ink deposition modeling. Gaussians are a good empirical match to the patterns made by ink drops on paper, which can be thought of as a diffusion or percolation process. Alternatively, a chebyshev polynomials or a wide variety of adjustable functions may be employed to get a similar result. The Gaussian shaped ink deposition profile concept is extended to match provided levels of large-scale ink deposition vs DC.

Large-scale ink deposition is the macro level average amount of ink deposited in a unit area for an input digital count for the set of properly functioning pel forming element 165 (e.g., producing no artifacts), in an area widely separated from the nozzles in local groups 1 and 2 and excluding the jet out nozzle, for each color X (e.g., CMY & K). The result is a model that describes the micro level distributions of ink, created from large-scale average halftone ink deposition, where the micro level is provided by adding a Gaussian shaped ink deposition profile description for a pel forming element 165 included in Local Group 1 and Local Group 2. The contribution from the jet out nozzle itself is zero since it will be disabled.

For a single pel forming element 165, ink deposition on the media along the pel forming element 165 (or nozzle) array direction (e.g., x direction) can be described by the equation:

$$\text{ID}(x)=\text{Peak\_ink\_deposition\_single\_nozzle}*\exp^{-((x\hat{}2)/(2*a\hat{}2))}$$

Assuming for a single pel forming element 165, Peak_ink_deposition_single_nozzle is a function of DC, where DC is digital count (e.g., gray level). This basically assumes that the ink deposition for different DC levels modulates the peak ink deposition of the Gaussian, resulting in a Gaussian shaped ink deposition profile:

$$\text{ID}(x,\text{DC})=\text{Peak\_ink\_deposition\_single\_nozzle}(\text{DC})*\exp^{-((x\hat{}2)/(2*a\hat{}2))},$$

where x is distance in X direction, and a is the standard deviation of Gaussian distribution along the X direction.

The single pel forming element 165 model is extended to describe a collection of pel forming elements 165 from a printhead 162 array assuming adding seven nozzles are sufficient to obtain contributions from all of the individual elements at x equals zero (in this case seven pel forming elements are in the local group however the local group may be 2, 3, 4, 5, 6, 7, 8, 9 or more pel forming elements), where variable s is the spacing between nozzles in the x direction (e.g., variable s is equal to the inverse of the resolution of the nozzle array in Dots Per Inch). The ink deposition functions are associated with a spacing amount (x-direction physical location) for the non-functioning pel forming element(s) and the functioning pel forming elements. The ink deposition function (IDtotal) written as a function of x position and DC level, formed by the sum of seven individual Gaussian shaped ink deposition profiles may then be expressed as:

$$\begin{aligned}\text{IDtotal}(x,\text{DC}) = {} & \text{Peak\_ink\_deposition\_single\_nozzle}(\text{DC})*\exp^{-(x\hat{}2)/(2*a\hat{}2)} + \text{Peak\_ink\_deposition\_single\_nozzle}(\text{DC})*\exp^{-((x-s)\hat{}2)/(2*a\hat{}2)} + \\ & \text{Peak\_ink\_deposition\_single\_nozzle}(\text{DC})*\exp^{-((x-(2*s))\hat{}2)/(2*a\hat{}2)} + \text{Peak\_ink\_deposition\_single\_nozzle}(\text{DC})*\exp^{-((x-(3*s))\hat{}2)/(2*a\hat{}2)} + \\ & \text{Peak\_ink\_deposition\_single\_nozzle}(\text{DC})*\exp^{-((x+s)\hat{}2)/(2*a\hat{}2)} + \text{Peak\_ink\_deposition\_single\_nozzle}(\text{DC})*\exp^{-((x+(2*s))\hat{}2)/(2*a\hat{}2)} + \\ & \text{Peak\_ink\_deposition\_single\_nozzle}(\text{DC})*\exp^{-((x+(3*s))\hat{}2)/(2*a\hat{}2)}\end{aligned}$$

Profile aggregation engine 630 aggregates the Gaussian shaped ink deposition profiles to generate local ink contribution data for each of the plurality of color planes. In one embodiment, profile aggregation engine 630 receives drop standard deviation data 603 for each color plane and ink deposition grid vector 604 (x locations where ink depositions are to be computed) and aggregates the Gaussian shaped ink deposition profiles by summing contributions of Gaussian shaped ink deposition profiles at each location x to generate the corresponding local ink contribution data (e.g., ink contribution data for the local groups) for each of the plurality of color planes.

Profile aggregation engine 630 also receives large-scale ink contribution data 605 (e.g., the large-scale ink deposition versus DC curve (LID(DC))) for each color plane, which is used by profile aggregation engine 630 to combine the local ink contribution data and the large-scale ink contribution data to generate ink deposition data (IDtotal(x,DC)) that matches the large-scale ink contribution data for each color plane for the point x=0 (LID(DC)=IDtotal(0,DC)). Computing Peak_ink_deposition_single_nozzle (DC) at the point x=0 provides ink depositions that match the desired input 605 LID(DC). There are now a set of equations that describe the ink deposition at a micro level that have the same ink deposition as the provided large-scale ink deposition levels 605 as a function of DC.

$$\begin{aligned}\text{Peak\_ink\_deposition\_single\_nozzle}(\text{DC}) = \text{LID}(\text{DC}) / {} & [\exp^{-(x\hat{}2)/(2*a\hat{}2)} + \exp^{-((x-s)\hat{}2)/(2*a\hat{}2)} + \\ & \exp^{-((x-(2*s))\hat{}2)/(2*a\hat{}2)} + \exp^{-((x-(3*s))\hat{}2)/(2*a\hat{}2)} + \\ & \exp^{-((x+s)\hat{}2)/(2*a\hat{}2)} + \exp^{-((x+(2*s))\hat{}2)/(2*a\hat{}2)} + \\ & \exp^{-((x+(3*s))\hat{}2)/(2*a\hat{}2)}]\end{aligned}$$

This enables computing the ink depositions for the different groups that when combined equal the large-scale ink deposition function LID(DC). Large-scale ink deposition function (e.g., LID) is obtained from a characterization of a nominally operating printer to determine the amount of ink that is jetted into a large area versus DC levels. This can be determined by analyzing the macroscopic halftone characteristics of the amount of ink printed within an area by counting the total number of printed drops at each DC level, multiplying each total by its respective drop size, and summing the contributions together and finally dividing the total mass or volume by the area of the threshold array. This is repeated for each DC level to obtain LID(DC). Furthermore, Optical Density is related to large-scale ink deposition, based on an ink model such as Weibull. Achieving uniformity for Optical Density therefore requires achieving uniformity of ink deposition levels. Providing uniformity for the micro level ink depositions will achieve uniformity for micro level variations to Optical Density.

Ink deposition function generator 640 uses the large-scale ink deposition data to generate ink deposition functions associated with the IDLGJO1, IDLGJ02 and IDNILG groups (e.g., IDLGJO1(x,DC), IDLGJ02(x,DC) and NILG (x,DC)) for each color plane. Where IDLGJO1, IDLJO2 and IDNILG are the ink depositions as a function of x for the pel forming elements to be considered for analysis when a jet out is present. As discussed above, IDLGJO2 may be derived from IDLGJO1 and IDNILG. The pel forming elements 165 in IDLGJO1 and IDLGJO2 are the elements that will receive compensation by transfer function (TF) modification and/or modification of the halftone threshold array.

Consider an example having five adjacent pel forming elements (e.g., local group has five total elements) where the middle pel forming element will be assumed to be the jet out element. Using the previous result that solved for Peak_ink_deposition_single_nozzle (DC), IDLGJO1 is solved such that:

$$\text{IDLGJO1}(x,\text{DC}) = \text{Peak\_ink\_deposition\_single\_nozzle}(\text{DC})*\exp^{-((x-s)\hat{}2)/(2*a\hat{}2)} + \text{Peak\_ink\_deposition\_single\_nozzle}(\text{DC})*\exp^{-((x+s)\hat{}2)/(2*a\hat{}2)}$$

Similarly, the solution for IDLGJO2, with the central element that is not functioning will be:

$$\text{IDLGJO2}(x,\text{DC}) = \text{Peak\_ink\_deposition\_single\_nozzle}(\text{DC})*\exp^{-((x-(2*s))\hat{}2)/(2*a\hat{}2)} + \text{Peak\_ink\_deposition\_single\_nozzle}(\text{DC})*\exp^{-((x+(2*s))\hat{}2)/(2*a\hat{}2)}$$

The solution for IDLGJO0, with only the central functioning element (e.g., Gaussian ink deposition profile corresponding to a functioning jet-out nozzle), will be:

$$\text{IDLGJO0}(x,\text{DC}) = \text{Peak\_ink\_deposition\_single\_nozzle}(\text{DC})*\exp^{-((x)\hat{}2)/(2*a\hat{}2)}$$

and finally the not-in-local group ink deposition includes contributions from the remaining elements, such that:

$$\text{IDNILG}(x,\text{DC}) = \text{Peak\_ink\_deposition\_single\_nozzle}(\text{DC})*\exp^{-((x-(3*s))\hat{}2)/(2*a\hat{}2)} + \text{Peak\_ink\_deposition\_single\_nozzle}(\text{DC})*\exp^{-((x+(3*s))\hat{}2)/(2*a\hat{}2)}$$

As a result, the sum of all of these ink depositions will equate to IDtotal.

$$\text{IDLGJO0}(x,\text{DC}) + \text{IDLGJO1}(x,\text{DC}) + \text{IDLGJO2}(x,\text{DC}) + \text{IDNILG}(x,\text{DC}) = \text{IDtotal}(x,\text{DC}).$$

Similar sets of equations may be written for different cases for the number of pel forming elements which are either functioning or non-functioning (e.g., jet out). The previous equations assume that seven total Gaussian shaped ink deposition profiles are sufficient to account for the ink deposition contributions of all adjacent pel forming elements. The number of Gaussian shaped ink deposition profiles used in the equations can be increased to further improve the accuracy or to account for larger values of a, which relates to the ink spreading in paper. The sum of all of the jetting elements equaling IDtotal, achieves the objective to match the large-scale ink deposition in areas far away from non-functioning nozzles, where all nearby nozzles are functioning properly. The number of elements in these equations can be increased or decreased if necessary to account for additional pel forming elements in the local groups.

Figure 7:
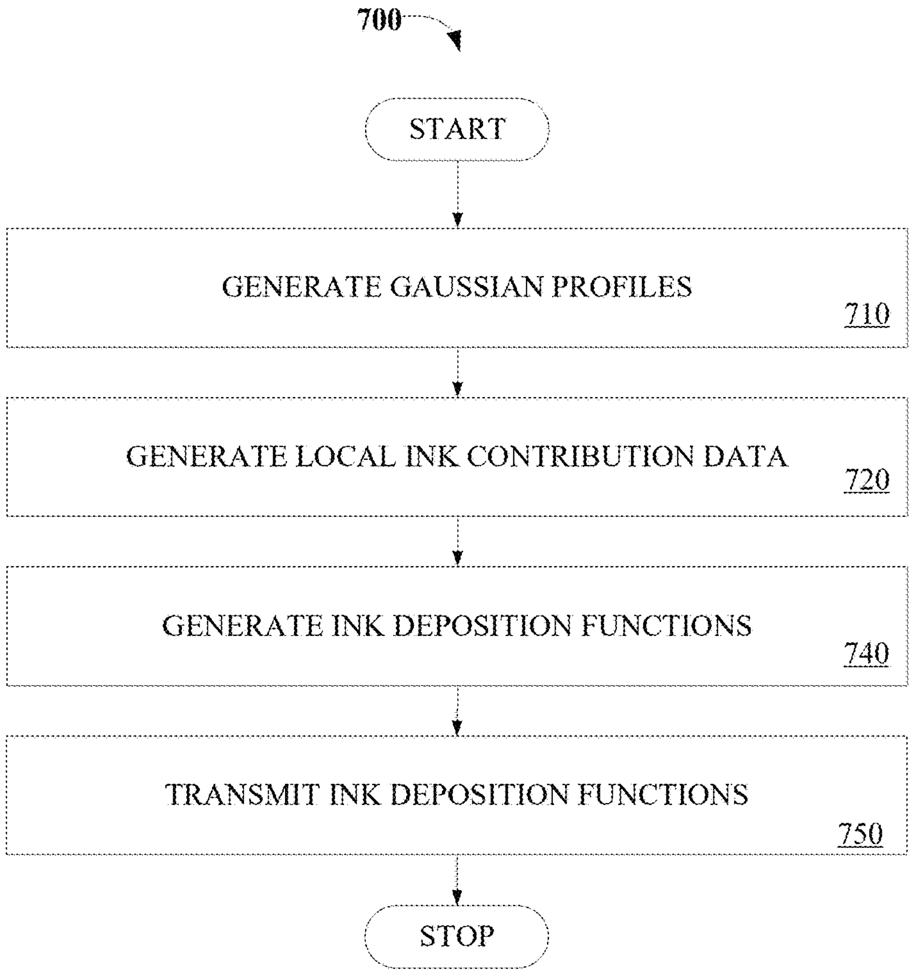
FIG. 7 is a flow diagram illustrating one embodiment of a process to compute ink deposition.

FIG. 7 is a flow diagram illustrating one embodiment of a process 700 to generate the ink deposition functions. Process 700 may be performed by processing logic that may include hardware (e.g., circuitry, dedicated logic, programmable logic, microcode, etc.), software such as instructions run on a processing device, or a combination thereof. In one embodiment, process 700 is performed by compensation module 216.

At processing block 710, each individual Gaussian profile associated with the IDLGJO1, IDLGJO2, IDLGJO0 and IDNILG groups of pel forming elements are generated, without including the Peak_ink_deposition_single_nozzle (DC) factor. At processing block 720, the Gaussian profiles are converted to Gaussian shaped ink deposition profiles and aggregated to generate the corresponding local ink contribution data. This generates a sum of Gaussian shaped ink deposition profiles that includes the Peak_ink_deposition_single_nozzle (DC) factor, which produces local group ink depositions that are compatible with the large-scale ink deposition levels at the macro level. At processing block 740 the ink deposition functions (IDLGJO1, IDLGJO2 and IDNILG) are generated. At processing block 750, the ink deposition functions are transmitted.

Figure 8:
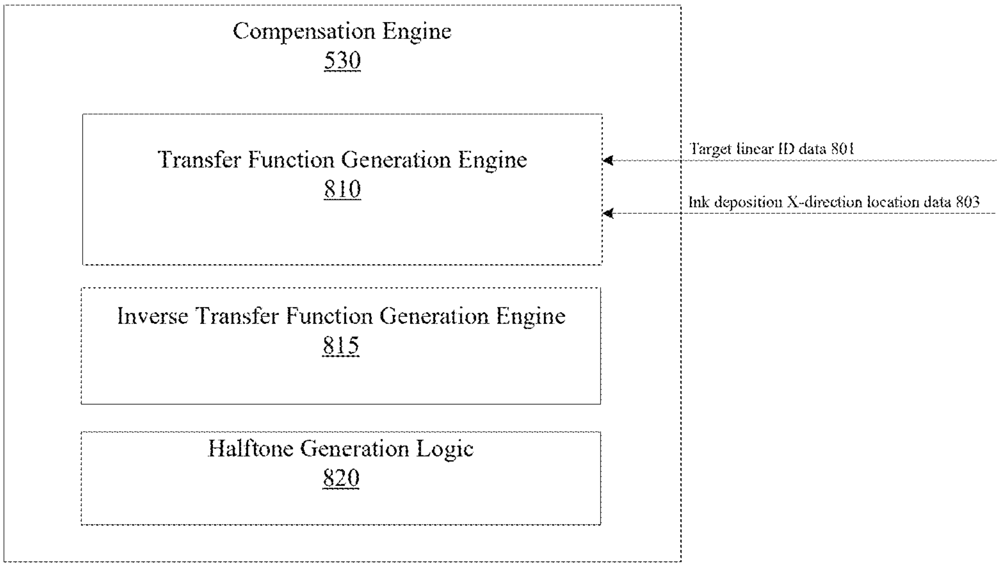
FIG. 8 illustrates one embodiment of a compensation engine.

Referring back to FIG. 5, compensation module 216 also includes a compensation engine 530 implemented to perform compensation based on the IDLGJO1, IDLGJO2, IDLGJO0 and IDNILG ink deposition functions. FIG. 8 illustrates one embodiment of compensation engine 530. As shown in FIG. 8, compensation engine 530 includes transfer function generation engine 810 that is used to perform compensation by generating a transfer function (TF_X) for each color plane (e.g., TF_Cyan, TF_M, TF_Y, TF_K) based on the IDLGJO1, IDLGJO2, IDLGJO0 and IDNILG ink deposition functions. IDLGJO1 and IDLGJO2, which when added equate to IDLG_X. In one embodiment, compensation engine 530 receives target linear ID data (target IDLG) 801. In such an embodiment, the target linear ID is IDmax=IDJO(0,255)−ID Knockdown, where ID_Knockdown is an ID level that reduces further the target ID. IDJO(0,255) defines the ink deposition minimum in the valley caused by the jet-out, at x=0 and DC level 255; where, IDJO(0,255)=IDtotal(0,255)−IDLGJO0(0,255). In a further embodiment, transfer function generation engine 810 generates a calibration TF to achieve a linear ID for steady state IDNILG with calibration (NILGwCal).

In one embodiment, compensation module 216 generates transfer functions TF1 based on IDLGJO1 and subsequently generates transfer functions TF2 based on TF1 and IDLGJO2. In such an embodiment, the contribution fraction of ink deposition contributed by IDLGJO1 is defined as w. Assuming IDLGJO1 is formed by the two Gaussian shaped ink deposition profiles nearest to the jet-out and IDLGJO2 are formed by the Gaussian shaped ink deposition profiles one pel further away on each side of the jet-out:

$$w*(\mathrm{IDtotal}\_X(x,\mathrm{DC})-\mathrm{IDNILG}\_X(x,\mathrm{DC}))=w*\mathrm{IDLG}\_X(x,\mathrm{DC})=\mathrm{IDLGJO1}\_X(x,\mathrm{TF1}\_X(\mathrm{DC})).$$

Solving for TF1 at specific x location and w (e.g., x=0) provides a solution for a location centered on the JO nozzle, such that:

$$\mathrm{TF1}\_X(\mathrm{DC})=\mathrm{IDLGJO1}\_X^{-1}(w*(\mathrm{IDtotal}\_X(x,\mathrm{DC})-\mathrm{IDNILG}\_X(x,\mathrm{DC})=\mathrm{IDLGJO1}\_X^{-1}(w*\mathrm{IDLG}\_X(x,\mathrm{DC}))$$

Interpreting this result, assuming a calibration model w*IDLG_X(x, DC) is the target (or desired) function to achieve with calibration from TF1, while $\mathrm{IDLGJO1}\_X^{-1}$ is the inverse function of the measured (or available) ID. Using the derived TF1, the previous equations are substituted in and a solution for TF2 is obtained:

$$\mathrm{IDLG}\_X(x,\mathrm{DC})-\mathrm{IDLGJO1}\_X(x,\mathrm{TF1}\_X(\mathrm{DC}))=\mathrm{IDLGJO2}\_X(x,\mathrm{TF2}\_X(\mathrm{DC}))$$

$$\mathrm{TF2}\_X(\mathrm{DC})=\mathrm{IDLGJO2}\_X^{-1}(\mathrm{IDLG}\_X(x,\mathrm{DC})-\mathrm{IDLGJO1}\_X(x,\mathrm{TF1}\_X(\mathrm{DC})))$$

Interpreting this result, IDLG_X(x, DC)−IDLGJO1_X(x, TF1_X(DC)) is the target function to achieve with calibration from TF2, while $\mathrm{IDLGJO2}\_X^{-1}$ is the inverse function of the measured ID from IDLGJO2.

According to one embodiment, TF1 is initially determined using the w weight (e.g., a weighting factor). The ID remaining (residual) that is not compensated (e.g., is not corrected) becomes the new target for the IDLGJO2 and forms the basis for the TF2. In other embodiments, multiple variations of this approach are possible. For example, TF2 may be determined for IDLGJO2 first based on the w factor, then TF1 is determined for IDLGJO1 based on the residual ID employing TF2 and IDLGJO2. In addition, more than two TFs may be derived. For example, using weight w, TF1 can be derived. Subsequently, using weight w2, w2 times the residual ID with TF1 applied defines the target for TF2. As shown, each set of transfer functions (e.g., TF1, TF2, TF3) is generated based on weighted contributions to the joint target response. A resulting technical benefit of applying the weighting factor is that the sets of transfer functions and the resulting compensations for the different local groups may be different and the compensations may be further refined.

In an additional embodiment, a third local group may be added with the resulting technical benefit of further refining the compensations. In that case, compensation module 216 generates sets of transfer functions TF1, TF2 and TF3. In addition to the previously described local groups 1 and 2, the third local group employed is IDLGJO3, formed by the two Gaussian shaped ink deposition profiles three pels away from the jet-out. Furthermore, IDNILG is redefined to exclude three local groups, IDLGJO3, IDLGJO2 and IDLGJO1. Similarly, IDLG is redefined to include IDLGJO3:

$$w*(\mathrm{IDtotal}\_X(x,\mathrm{DC})-\mathrm{IDNILG}\_X(x,\mathrm{DC}))=w*\mathrm{IDLG}\_X(x,\mathrm{DC})=\mathrm{IDLGJO1}\_X(x,\mathrm{TF1}\_X(\mathrm{DC})).$$

Solving for TF1 at specific x location and w (e.g., x=0) provides a solution for a location centered on the JO nozzle, such that:

$$\mathrm{TF1}\_X(\mathrm{DC})=\mathrm{IDLGJO1}\_X^{-1}(w*(\mathrm{IDtotal}\_X(x,\mathrm{DC})-\mathrm{IDNILG}\_X(x,\mathrm{DC})=\mathrm{IDLGJO1}\_X^{-1}(w*\mathrm{IDLG}\_X(x,\mathrm{DC}))$$

Interpreting this result, assuming a calibration model w*IDLG_X(x, DC) is the target (or desired) function to achieve with calibration from TF1, while $\mathrm{IDLGJO1}\_X^{-1}$ is the inverse function of the measured (or available) ID. Using the derived TF1, the previous equations are substituted in and a solution for TF2 is obtained:

$$w2*(\mathrm{IDLG}\_X(x,\mathrm{DC})-\mathrm{IDLGJO1}\_X(x,\mathrm{TF1}\_X(\mathrm{DC})))=\mathrm{IDLGJO2}\_X(x,\mathrm{TF2}\_X(\mathrm{DC}))$$

$$\mathrm{TF2}\_X(\mathrm{DC})=\mathrm{IDLGJO2}\_X^{-1}(w2*(\mathrm{IDLG}\_X(x,\mathrm{DC})-\mathrm{IDLGJO1}\_X(x,\mathrm{TF1}\_X(\mathrm{DC})))$$

Interpreting this result, w2*(IDLG_X(x, DC)−IDLGJO1_X(x, TF1_X(DC))) is the target function to achieve with calibration from TF2, while $\mathrm{IDLGJO2}\_X^{-1}$ is the inverse function of the measured ID from IDLGJO2.

$$\mathrm{TF3}\_X(\mathrm{DC})=\mathrm{IDLGJO3}\_X^{-1}(\mathrm{IDLG}\_X(x,\mathrm{DC})-(\mathrm{IDLGJO1}\_X(x,\mathrm{TF1}\_X(\mathrm{DC}))+\mathrm{IDLGJO2}\_X(x,\mathrm{TF2}\_X(\mathrm{DC}))))$$

Interpreting this result, (IDLG_X(x, DC)−(IDLGJO1_X(x, TF1_X(DC))+IDLGJO2_X(x, TF2_X(DC)))) is the target function to achieve with calibration from TF3, while IDLGJO3_$X^{-1}$ is the inverse function of the measured ID from IDLGJO3. TF3 (e.g., a third set of transfer functions) can be determined for the final residual ID with both TF1 and TF2 applied.

In the case of inverse transfer functions, TF1 and TF2 are derived initially based on the selected w factor (e.g., weighting factor). ITF1 and ITF2 are then derived from the inverse functions of TF1 and TF2 respectively. Similarly, if three TFs are employed (e.g., TF1, TF2, and TF3), three ITFs (e.g., ITF1, ITF2, and ITF3) are generated respectively from the three TFs based on the selected w and w2 factors. As shown, each set of inverse transfer functions (e.g., ITF1, ITF2, ITF3) is generated based on weighted contributions to the joint target response. A resulting technical benefit of applying the weighting factor is that the sets of inverse transfer functions and the resulting compensations for the different local groups may be different and the compensations may be further refined.

In a further embodiment, a combination of the IDs for different x locations may be employed to define the targets instead of a single one computed at x=0. This creates a solution that prevents, mitigates, or minimizes overshoot and undershoot to the target ID. Using a target value that is less than the total ID available from all nozzles, permits compensation (e.g., correction) for a larger range of DC values and illustrates the value of having headroom or extra-large drop sizes.

Ink depositions may include the impact of calibration. The ID for all positions x at level 255 with the jet-out forms an "upper limit" for the ID that can be achieved with compensation. This is because at this level all nozzles are operating at level 255 and no further boost from a TF is possible. Therefore, the solution to fill this ID "valley" is to obtain additional ink from some type of headroom. Options include: 1) using larger drop sizes than the ones currently employed; or 2) using extra ink deposition that typically has been reduced due to engine calibration. In option 2 additional ink in the vicinity of the jet-out is employed for more effective compensation and ink outside the jet-out region is reduced to levels required by engine calibration.

In one embodiment, transfer function generation engine 810 generates the transfer functions using target linear ID data 801 and received input ink deposition X-direction location ($x_{offset}$) data 803. Ink deposition X-direction location data 803 indicates the one or more X-direction locations corresponding to the generated ink deposition functions and are associated with the corresponding generated transfer functions (or inverse transverse functions).

In the previous descriptions a value of x=0 was employed for the location to compute the ink deposition functions. Using an $x_{offset}$ alternate location value to determine the ink deposition functions may provide a technical advantage of a more balanced overshoot/undershoot in the vicinity of the jet out. This may produce smaller variations that further improve the jet out compensation for a range of x positions. Furthermore, $x_{offset}$ may have multiple locations defined. In this case the ink deposition is computed for each location and combined to produce a blended ink deposition (e.g., mean of multiple ink depositions). This again permits adjustment of the overshoot/undershoot to smooth the variations for different x locations. In the previous description the jet-out was at x=0 and ink deposition was computed at x=0. In the new case the jet-out is still at x=0, however ink deposition is computed at the $x_{offset}$ location. The result is a TF that is derived based on the ink depositions at the $x_{offset}$ location, instead of x=0.

Figure 9:
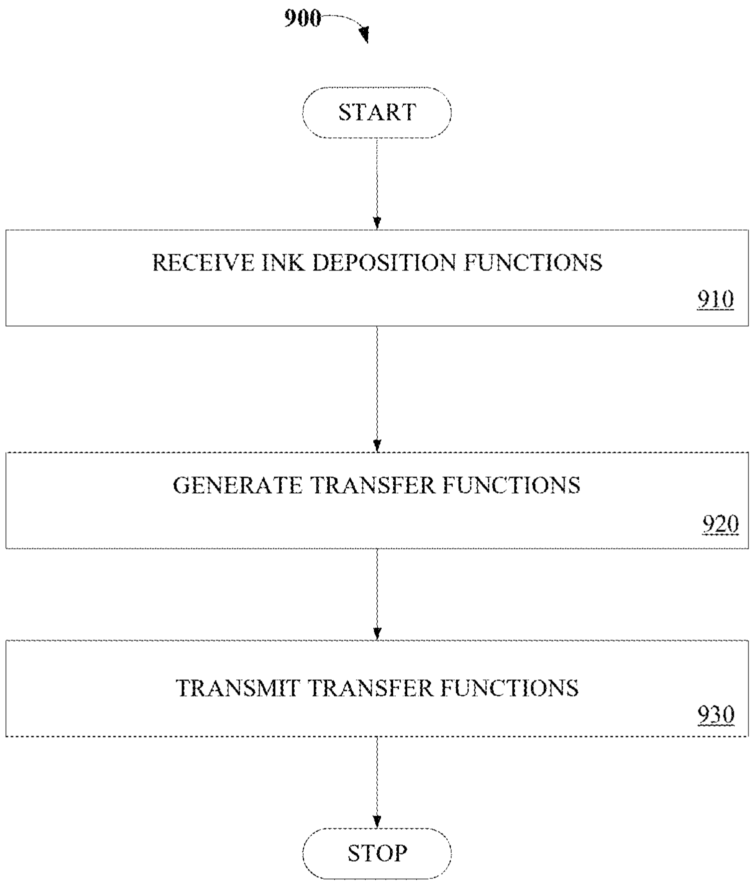
FIG. 9 is a flow diagram illustrating one embodiment of a process for generating transfer functions.

FIG. 9 is a flow diagram illustrating one embodiment of a process 900 for generating compensated transfer functions. Process 900 may be performed by processing logic that may include hardware (e.g., circuitry, dedicated logic, programmable logic, microcode, etc.), software such as instructions run on a processing device, or a combination thereof. In one embodiment, process 900 is performed by compensation module 216.

At processing block 910, ink deposition functions are received. At processing block 920, the transfer functions are generated based on the ink deposition functions. As discussed above, TF1 is first generated based on a weight w and then TF2 is generated considering the impact of TF1. At processing block 930, the transfer functions are transmitted. Printer system 130 may receive the transfer functions and apply them during the printing process either directly to the image data or mathematically compose them with other transfer functions (e.g., uniformity transfer functions) before being applied to image data.

In an alternative embodiment, compensation engine 530 performs compensation by using halftone generation logic 820 (FIG. 8) to generate compensated halftones based on the IDLGJO1, IDLGJO2, IDNILG and IDtotal ink deposition functions. In such an embodiment, compensated halftones are generated for each color plane (e.g., HT_C, HT_M, HT_Y, HT_K) by modifying the thresholds in a received (e.g., un-compensated, original) halftone design at specific columns adjacent to the jet-out. Each modified column of the threshold array for all drop sizes is transformed using inverse transfer functions (ITF_X) generated for each color plane (e.g., ITF_Cyan, ITF_M, ITF_Y, ITF_K) in order to generate a compensated halftone design.

In a further embodiment, a received halftone design is implemented to generate the large-scale ink deposition data vs DC from which the ink deposition functions are derived. Inverse transfer function generation engine 815 generates inverse transfer functions that are used to generate compensated halftones. Pel forming elements 165 adjacent or close to defective nozzles are adjusted to compensate defective pel forming elements 165. According to one embodiment, the inverse transfer functions are applied to specific columns of the threshold arrays of un-compensated halftones to generate the compensated halftones.

An inverse transfer function is the reversed (e.g., inverted) application of the transfer function, where the output digital count values of the transfer function form the input digital count values of the ITF and the input digital count values of the transfer function form the output digital count values of the inverse transfer function. The ITFs may be generated based on a mathematical determination of the inverse function of the transfer functions. ITF may also be derived directly from the ink deposition functions. Applying this to converting threshold values to create a halftone threshold array that contains the jet out compensation:

$$g\_output = ITF\_X(g\_input),$$

where g represents digital count threshold values; g_input is the initial threshold value from the un-compensated halftone and g_output is the compensated threshold array value for the compensated halftone.

Each threshold for all drop sizes for the columns of the threshold array corresponding to the pel forming elements that will be compensated are converted in the same manner using the ITF.

Figure 10:
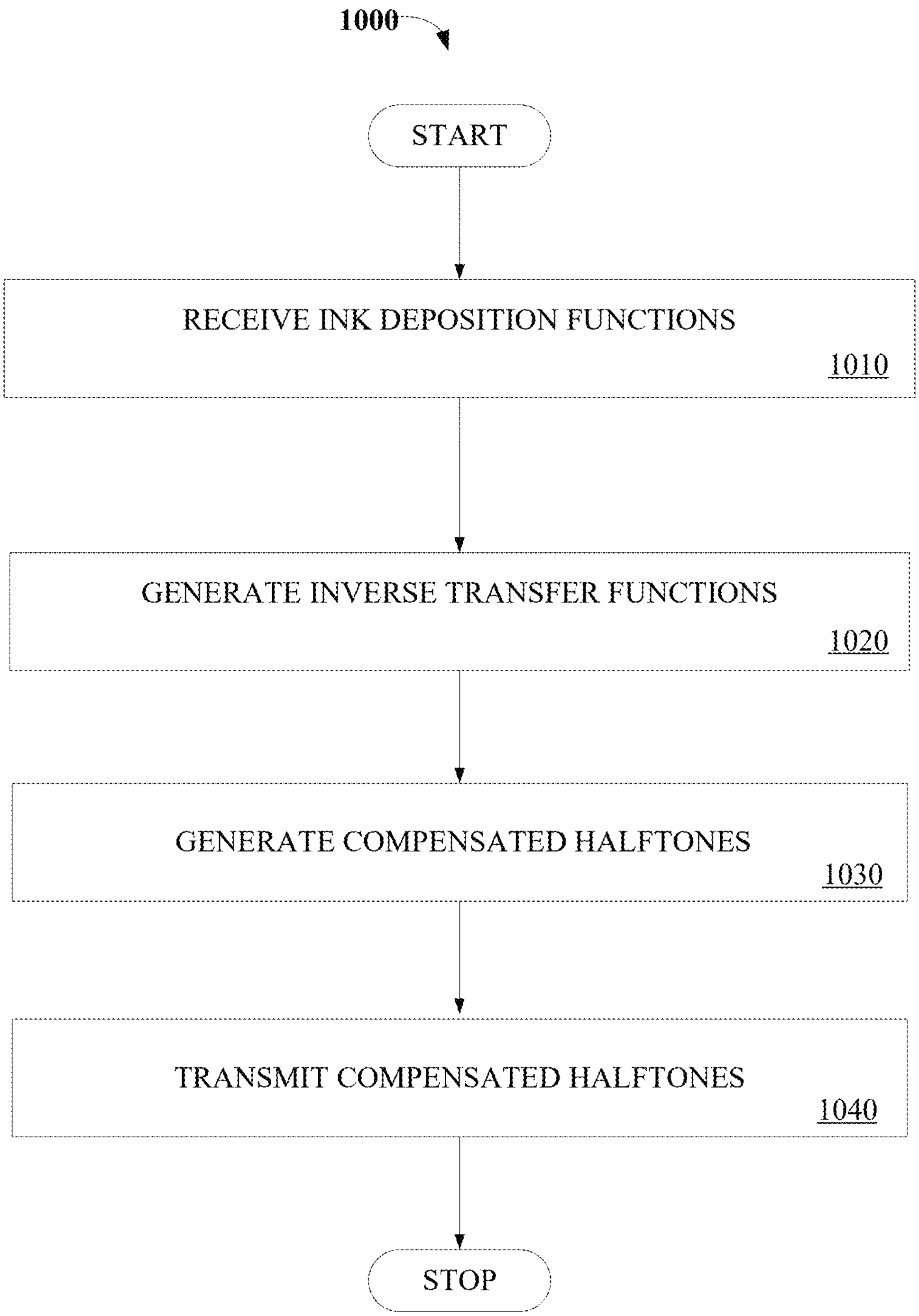
FIG. 10 is a flow diagram illustrating one embodiment of a process for generating compensated halftones.

FIG. 10 is a flow diagram illustrating one embodiment of a process 1000 for generating compensated halftones. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by compensation module 216.

At processing block 1010, ink deposition functions are received. At processing block 1020, inverse transfer functions are generated (e.g., based on the transfer functions or based on the ink deposition functions). ITF1 and ITF2 functions may be derived from their respective previously described TF1 and TF2 functions by employing the mathematical concept of computing the inverse function of composite functions. At processing block 1030, the compensated halftones are generated. As discussed above, the compensated halftones are generated by applying the inverse transfer functions to specific columns of the un-compensated halftone (e.g., un-compensated threshold array) implemented to generate the compensated halftone threshold array. At processing block 1040, the compensated halftones (e.g., compensated halftone threshold arrays) are transmitted. Printer system 130 may receive the compensated halftones and apply them during the printing process.

Figure 11:
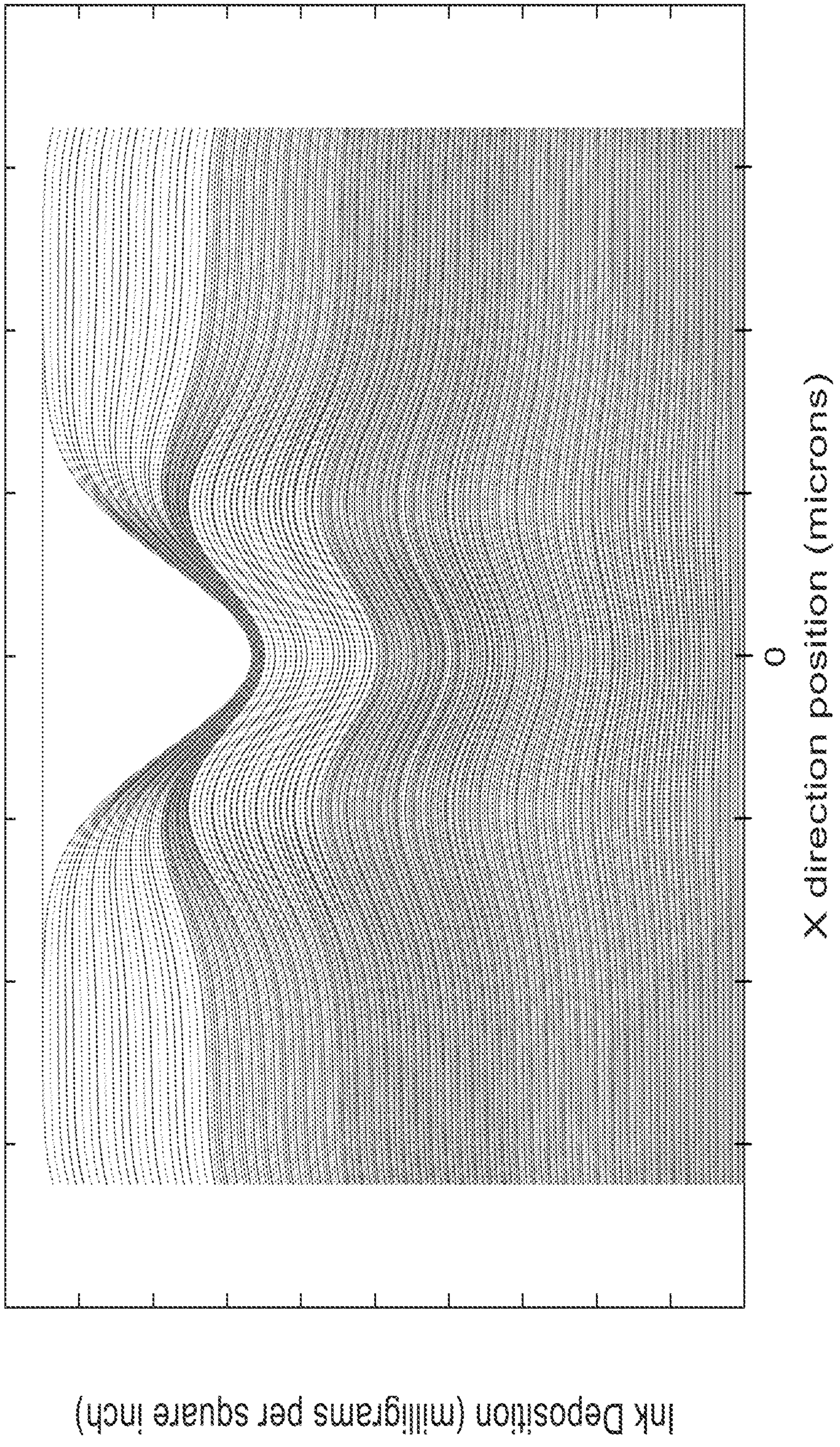
FIG. 11 is a graph illustrating jet-out ink deposition with compensation.

FIG. 11 is a graph illustrating jet-out ink deposition with applied compensation (e.g., compensated transfer functions or compensated halftones). As shown in FIG. 11, the valley area has been compensated at the x=0 position, which is the center of the jet out pel element. Comparing the compensated jet out ink depositions in FIG. 11 to the uncompensated jet out ink depositions in FIG. 3B, shows that in the area near position x=0 (e.g., the location of the jet out pel forming element) the family of ink deposition functions (e.g., ink deposition curves) are flatter in FIG. 11 than in FIG. 3B. This flatness is indicative of the degree of uniformity of the measured printed output. Furthermore, at x=0 the level of ink deposition in FIG. 11 has been increased for each DC level to match the deposition outside the jet out region (e.g., steady state ink deposition on the far right and far left).

Figure 12:
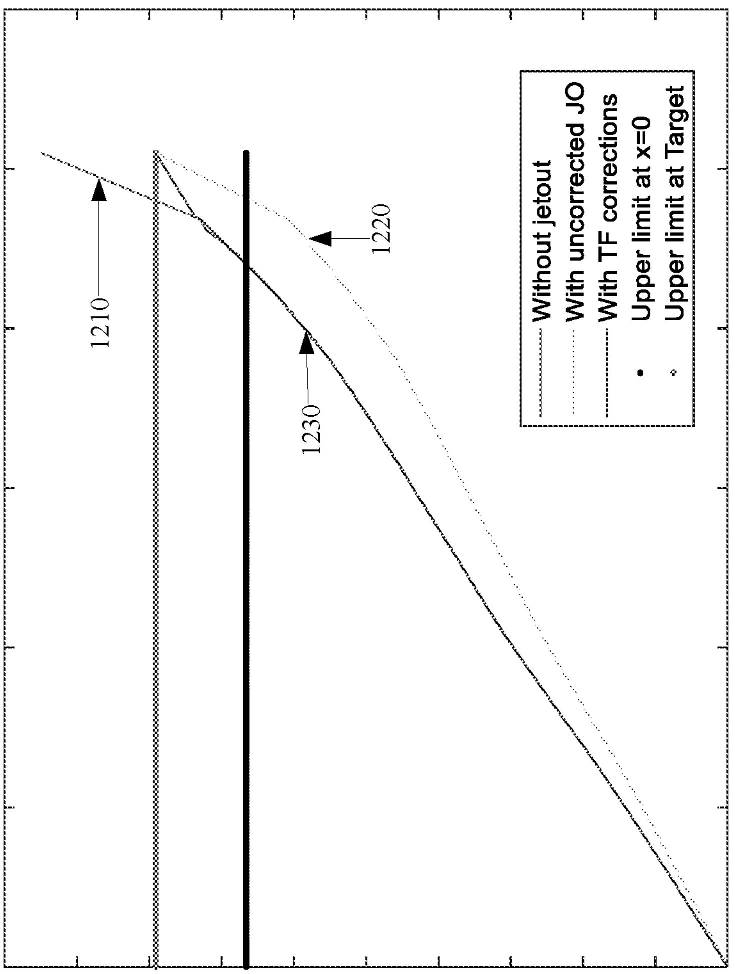
FIG. 12 is a graph illustrating ink deposition vs digital count with jet-out compensation.
Figure 13:
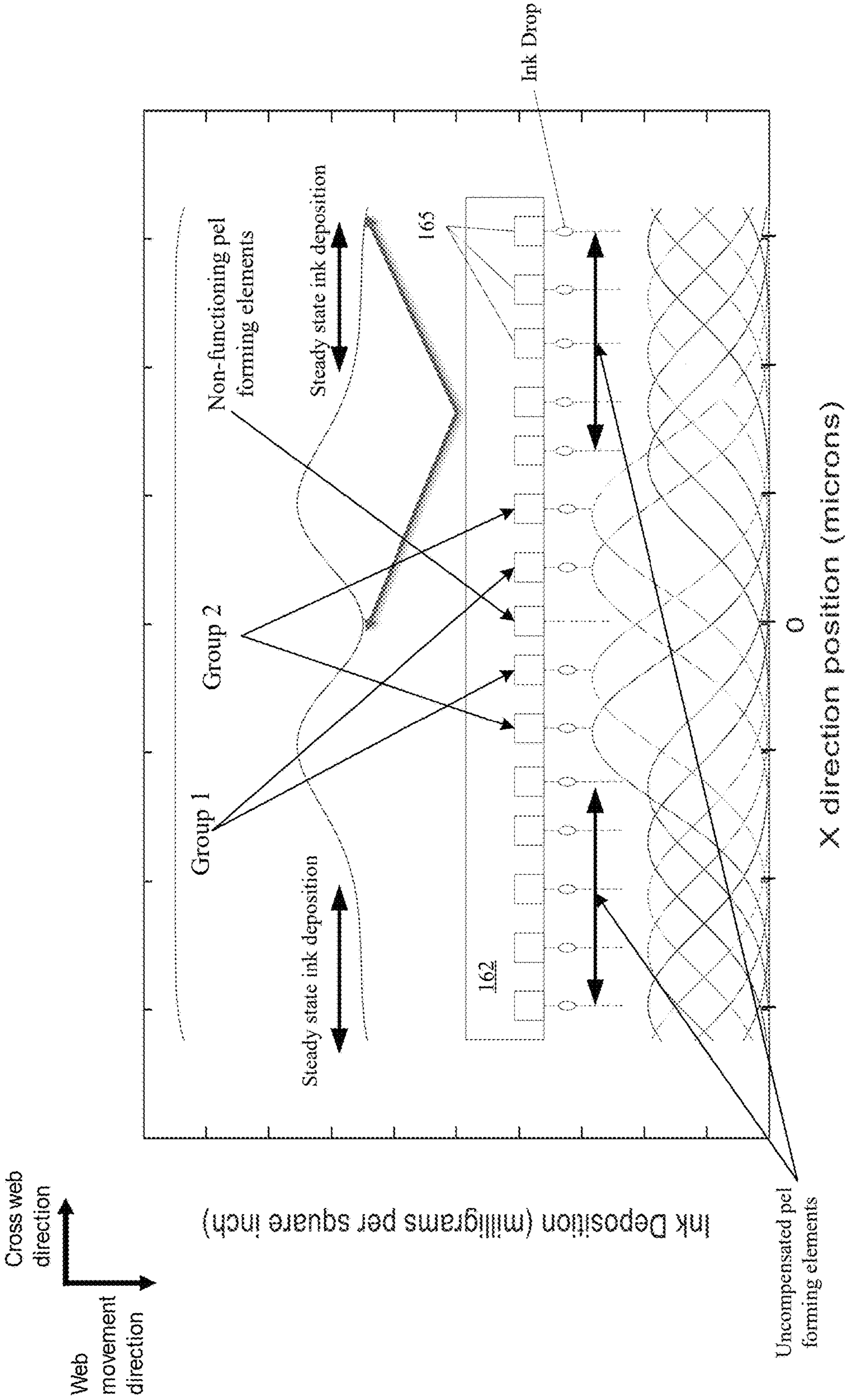
FIG. 13 is a graph illustrating Gaussian shaped ink deposition profiles with jet-out compensation.

Additionally, FIG. 12 is a graph illustrating ink deposition vs digital count with jet-out compensation similar to FIG. 4. Line 1210 indicates the target ink deposition, while line 1220 indicates uncompensated ink deposition associated with a jet-out. Line 1230 shows ink deposition compensated via transfer functions (or compensated halftones) generated according to the above-described compensation processes. As shown in FIG. 12, the compensated ink deposition (e.g., line 1230) matches the target ink deposition (e.g., line 1210) up to a threshold level, at which point compensation may not be achieved. FIG. 13 illustrates one embodiment of a compensation of a non-functioning (e.g., jet-out/deviated-jet) nozzle.

FIG. 13 shows a print head 162 including pel forming elements 165 that each generate ink drops, where each pel forming element is associated with a Gaussian shaped ink deposition profile. In this example, print head 162 comprises functioning and non-functioning pel forming elements 165. In this example, the non-functioning pel forming element 165 is a jet-out located at the middle of the plotted data (e.g., position x=0), the corresponding pel forming element 165 ejects no ink drop and the corresponding ink deposition from the jet-out is zero. The other pel forming elements (e.g., not at position x=0) shown are the functioning pel forming elements. Four Gaussian shaped ink deposition profiles have been boosted, two on each side of jet-out, to compensate for the missing ink deposition created by the jet-out artifact. The level applied to these four compensated nozzles at each DC is obtained from the compensation transfer functions generated from the ink deposition functions. While the levels of the two boosted Gaussian shaped ink deposition profiles are shown equal for simple illustration purposes, the levels need not be the same (e.g., as noted above, the compensation for each nozzle group may be different).

The curve in the middle shows the total ink deposition from all of the Gaussian shaped ink deposition profiles at DC level 217, which in this case is the DC level corresponding to the threshold ink deposition level where further boosting by transfer functions of the ink deposition in the valley is not possible. The curve illustrates that the boosted output of four nozzles provided an increased ink deposition so that the level in the “valley” at the jet out location is equal to the ink deposition outside the jet-out region (e.g., near the edges). The curve at the top shows the ink deposition that occurs at DC level 255 without the jet-out. Without the jet-out compensation the set of Gaussian shaped ink deposition profiles will all be the same and there will not be any boosted nozzle outputs. The group 1 Gaussian shaped ink deposition profiles include the Gaussian shaped ink deposition profiles immediately to the left and right of the Jet-out location (x=0) while the group 2 Gaussian shaped ink deposition profiles are the Gaussian shaped ink deposition profiles one pel further to the left and right of the group 1 Gaussian shaped ink deposition profiles. TF1 is associated with the group 1 Gaussian shaped ink deposition profiles and TF2 is associated with the group 2 Gaussian shaped ink deposition profiles. In this case since the group 1 and 2 Gaussian shaped ink deposition profiles are boosted as much as possible the output of TF1 and TF2 is level 255. The remaining Gaussian shaped ink deposition profiles which are not members of group 1 and group 2 that are not boosted are all at DC level 217.

Referring back to FIG. 5, a verification engine 540 is also included within compensation module 216. Verification engine 540 applies compensation data to each of the color planes to generate compensated ink deposition functions (e.g., ID_C, ID_M, ID_Y, ID_K). In one embodiment, verification engine 540 applies the generated transfer functions to the large-scale ink deposition data (e.g., generated at profile aggregation engine 630) which generates a modified large-scale ink deposition curve (LID) that is used to generate the compensated ink deposition functions. However, in an alternative embodiment, verification engine 540 employs the compensated halftones as compensation data to generate the compensated ink deposition functions. In this embodiment, the compensated halftones are generated using the inverse transfer functions and the ink depositions computed for each column of the threshold array. This provides a means to verify the predicted TF compensated or halftone compensated artifacts.

Figure 14:
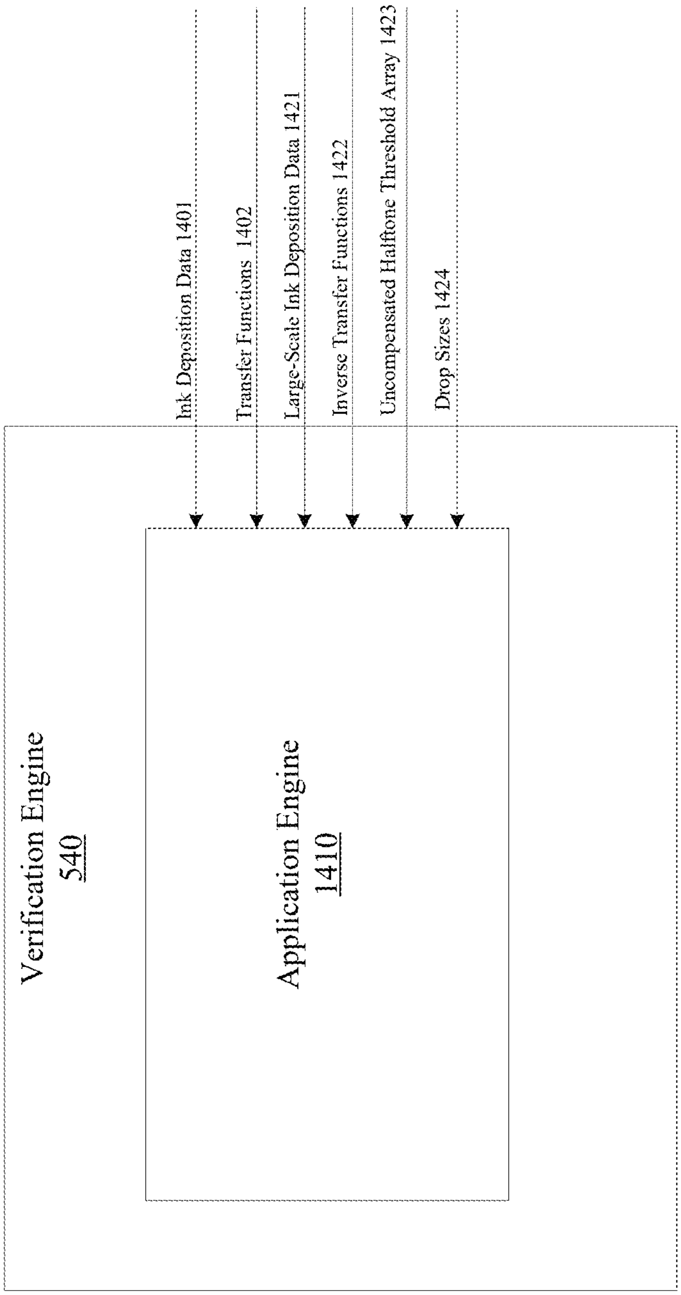
FIG. 14 illustrates one embodiment of a verification engine.

FIG. 14 illustrates one embodiment of verification engine 540, which includes an application engine 1410 to apply compensation data. As shown in FIG. 14, application engine 1410 receives large-scale ink deposition data 1401 and transfer functions 1402. In one embodiment, the generated transfer functions (TF1_X(DC) and TF2_X(DC)) 1402 are received and applied to the ink deposition data with jet out (IDLGJO1_X and IDLGJO2_X) 1401 to generate a compensation ink deposition function. In this embodiment, the compensation ink deposition function corresponds to the IDLGJO1 and IDLGJO2 ink deposition functions with compensation applied.

According to one embodiment, application engine 1410 compares the sum of the compensated ink deposition functions (IDLGJO1(x,TF1(DC)), IDLGJO2(x,TF2(DC))) and IDNILG to the sum of IDLGJO1, IDLGJO2, and IDNILG ink deposition functions to determine the difference between compensated and uncompensated ink depositions. In addition, both of these may be compared to LID to determine the difference between the compensated, uncompensated and ideal without the jet-out ink deposition levels. In such an embodiment, application engine 1410 verifies whether a difference between the compensated, uncompensated, and ideal ink deposition functions are within a predetermined threshold (e.g., as defined by a value received via GUI 550). In a further embodiment, application engine 1410 validates an acceptable compensation upon determining that the difference is within the predetermined threshold.

Figure 15:
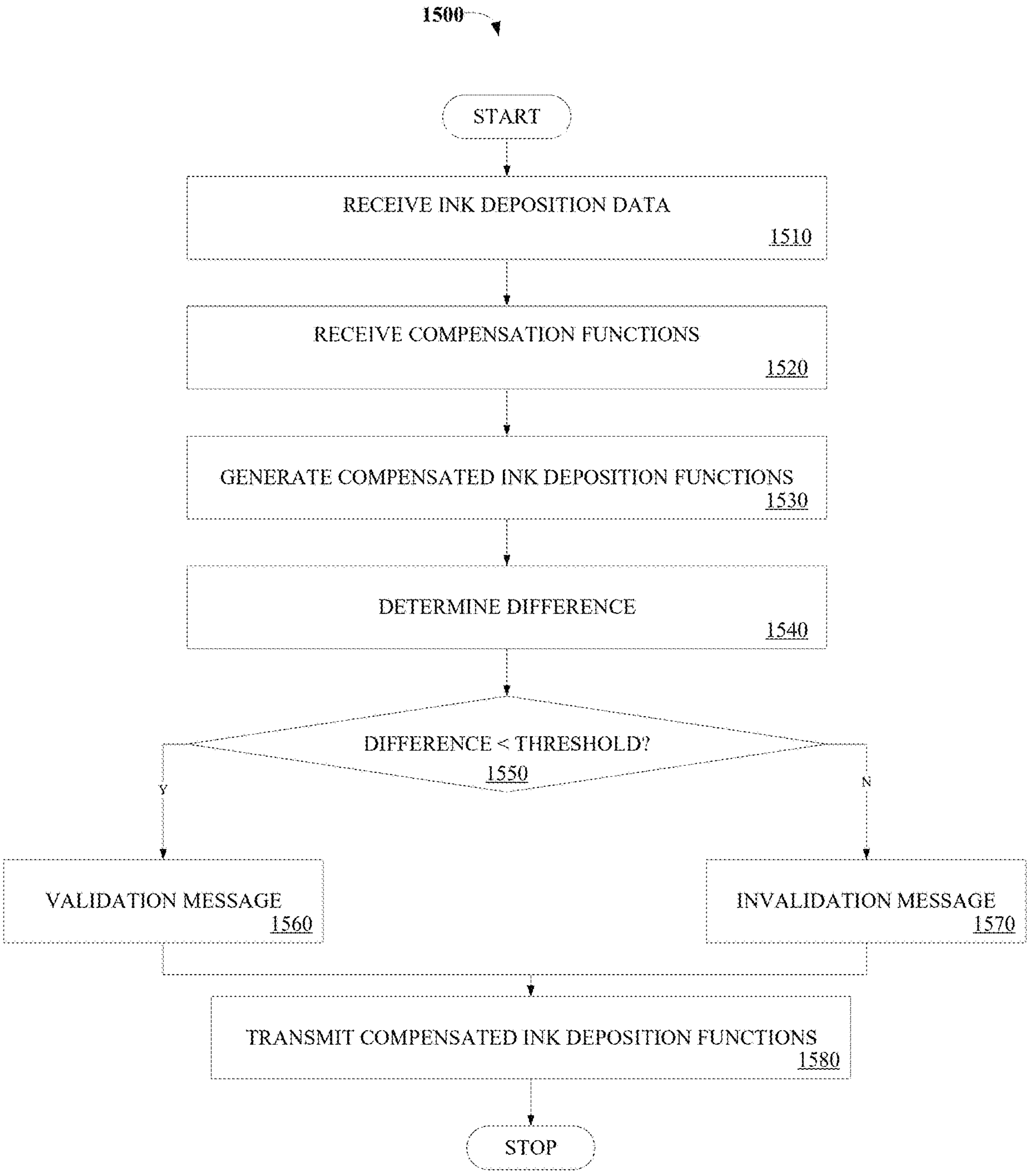
FIG. 15 is a flow diagram illustrating one embodiment of a verification process.

FIG. 15 is a flow diagram illustrating one embodiment of a verification process 1500 using transfer functions. Process 1500 may be performed by processing logic that may include hardware (e.g., circuitry, dedicated logic, programmable logic, microcode, etc.), software such as instructions run on a processing device, or a combination thereof. In one embodiment, process 1500 is performed by compensation module 216.

At processing block 1510, the ink deposition data 1401 (IDLGJO1, IDLGJO2 and IDNILG) are received. At processing block 1520, the compensation functions are received (e.g., generated transfer functions 1402 are received). At processing block 1530, the transfer functions 1402 are applied to the IDLGJO1 and IDLGJO2 ink deposition data 1401. The ink deposition functions with transfer functions applied and IDNILG are all added together to generate combined compensation ink deposition functions (e.g., fourth ink deposition functions). At processing block 1540, a difference between the combined compensation ink deposition functions and the LID ink deposition functions is determined. Comparing combined compensation results to LID indicates how close the match is over each specific range of DC levels. Comparing the sum of the ink deposition functions with transfer functions applied (IDLGJO1(x,TF1(DC))+IDLGJO2(x,TF2(DC))+IDNILG(x,DC)) and the sum of the ink deposition functions without transfer functions applied (IDLGJO1(x,DC)+IDLGJO2(x,DC)+IDNILG(x,DC)) allows one to quantify how much modification of ink deposition has occurred due to the transfer function compensation.

At decision block 1550, a determination is made as to whether the difference is less than the threshold. If so, a validation message is generated indicating that the compensation has been validated as acceptable, processing block 1560. Otherwise, an invalidation message is generated indicating that the compensation has been invalidated as unacceptable, processing block 1570. At processing block 1580, the compensated ink deposition function as well as an associated message (e.g., validation or invalidation message) is transmitted.

FIG. 14 illustrates an additional embodiment of verification engine 540 for the case of inverse transfer functions, which includes an application engine 1410 to apply compensation data. As shown in FIG. 14, application engine 1410 receives large-scale ink deposition data 1421, inverse transfer functions 1422, uncompensated halftone threshold array 1423 and the drop sizes 1424. In one embodiment, the generated inverse transfer functions (ITF1_X(DC) and ITF2_X(DC)) 1422 are received and applied to the thresholds in the associated columns of uncompensated threshold array. Analyzing the compensated threshold data with the drop sizes for each DC level generates a set of different drop sizes. The mean values of the set of printed drop sizes for the associated columns in the threshold array for the local groups results in an average mass or volume for the compensated halftone at each DC level. A mean value used to mitigate the local variations to ink deposition caused by halftoning using a limited number of drop sizes.

Dividing the mean drop mass or volume for each DC level by the threshold array area for a single pel column of thresholds, results in a compensated peak amplitude ink deposition level for a single nozzle vs DC with ITF1 applied. This compensated peak amplitude for a single nozzle vs DC with ITF1 applied is Peak_ink_deposition_single_nozzle_ITF_compensated(DC)). Combining Peak_ink_deposition_single_nozzle_ITF1_compensated (DC) with the Gaussians associated with the local group, results in an ink deposition profile for local group 1 with halftone ITF1 applied: IDLGJO1_ITF1 (x,DC)=Peak_ink_deposition_single_nozzle_ITF1_compensated(DC)*exp−((x−s)^2)/(2*a^2)+Peak_ink_deposition_single_nozzle_ITF1_compensated (DC)*exp−((x+s)^2)/(2*a^2) Similarly, for local group 2 with ITF2 compensation of halftone threshold data: IDLGJO2_ITF2(x,DC)=Peak_ink_deposition_single_nozzle_ITF2_compensated(DC)*exp−((x−(2*s))^2)/(2*a^2)+Peak_ink_deposition_single_nozzle_ITF2_compensated (DC)*exp−((x+(2*s))^2)/(2*a^2)

According to one embodiment, application engine 1410 compares the sum of the compensated ink deposition functions (IDLGJO1_ITF1(x,DC), IDLGJO2_ITF2(x,DC)) and IDNILG to the sum of IDLGJO1, IDLGJO2, and IDNILG ink deposition functions to determine the difference between compensated and uncompensated ink depositions. In addition, both of these may be compared to LID to determine the difference between the compensated, uncompensated and ideal without the jet-out ink deposition levels. In such an embodiment, application engine 1410 verifies whether a difference between the compensated, uncompensated, and ideal ink deposition functions are within a predetermined threshold (e.g., as defined by a value received via GUI 550). In a further embodiment, application engine 1410 validates an acceptable compensation upon determining that the difference is within the predetermined threshold.

FIG. 15 is a flow diagram also illustrating one embodiment of a verification process 1500 using inverse transfer functions. Process 1500 may be performed by processing logic that may include hardware (e.g., circuitry, dedicated logic, programmable logic, microcode, etc.), software such as instructions run on a processing device, or a combination thereof. In one embodiment, process 1500 is performed by compensation module 216.

At processing block 1510, the ink deposition data xx (IDLGJO1, IDLGJO2, IDNILG and LID) are received. At processing block 1520, the compensation functions (e.g., the generated inverse transfer functions 1422, ITF1 and ITF2) are received as well as the uncompensated halftone threshold array 1423 and the drop sizes 1424. In one embodiment, the generated inverse transfer functions 1422 (ITF1_X(DC) and ITF2_X(DC)) are received and applied to the thresholds in the associated columns of uncompensated threshold array, as previously described, to determine IDLGJO1_ITF1(x, DC) and IDLGJO2_ITF2(x,DC).

The ink deposition functions generated with inverse transfer functions applied and IDNILG are all added together to generate combined compensation ink deposition functions (e.g., fourth ink deposition functions). At processing block 1550, a difference between the combined compensation ink deposition functions and the LID ink deposition functions is determined. Comparing combined compensation results to LID indicates how close the match is over each specific range of DC levels. Comparing the sum of the ink deposition functions determined with the inverse transfer functions (IDLGJO1_ITF1(x,DC)+IDLGJO2_ITF2(x,DC)+IDNILG (x,DC)) and the sum of the ink deposition functions without compensation applied (IDLGJO1(x,DC)+IDLGJO2(x,DC)+ IDNILG(x,DC)) allows one to quantify how much modification of ink deposition has occurred due to the inverse transfer function compensation.

At decision block 1550, a determination is made as to whether the difference is less than the threshold. If so, a validation message is generated indicating that the compensation has been validated as acceptable, processing block 1560. Otherwise, an invalidation message is generated indicating that the compensation has been invalidated as unacceptable, processing block 1570. At processing block 1580, the compensated ink deposition function as well as an associated message (e.g., validation or invalidation message) is transmitted.

Printhead Overlap Compensation

Figure 16A:
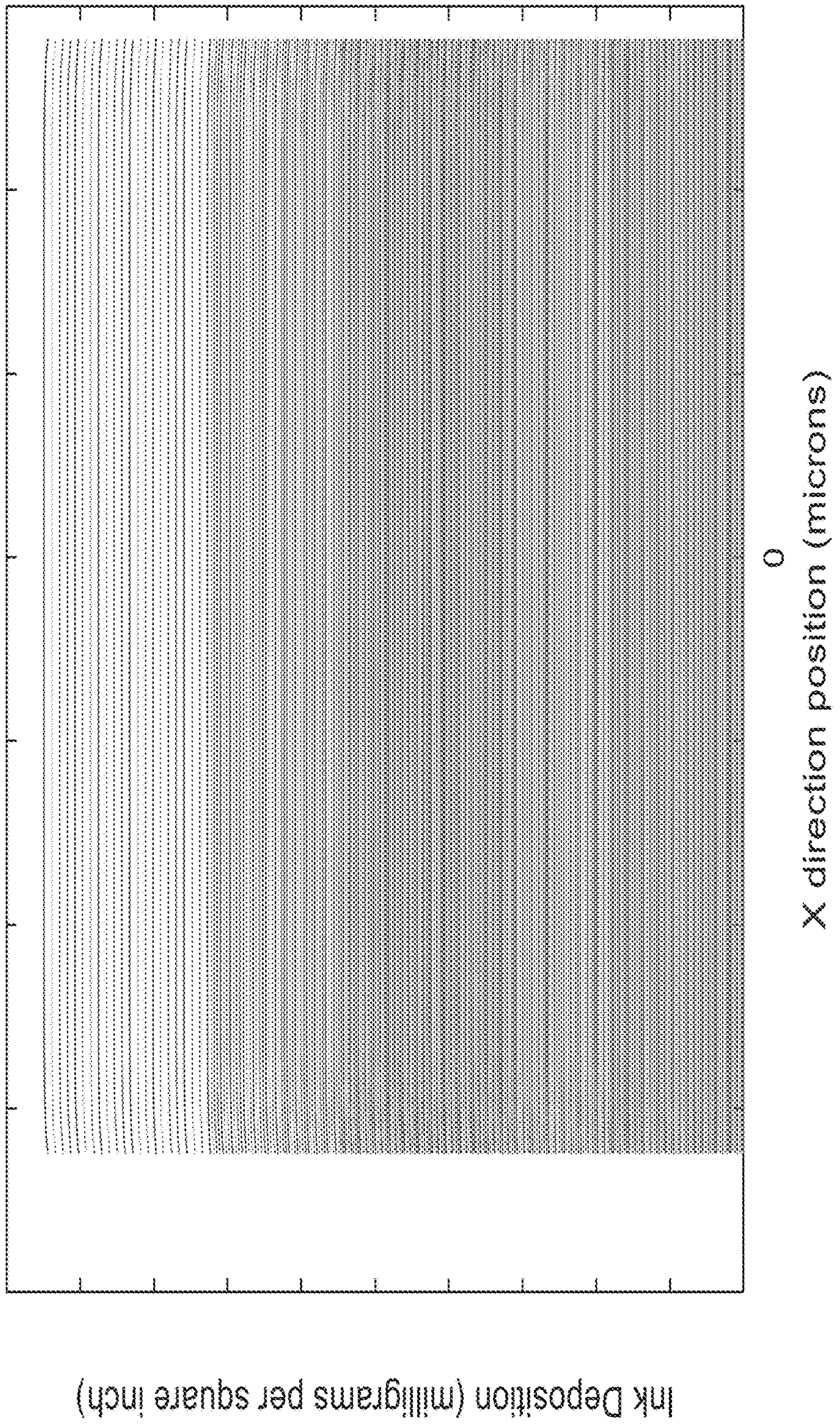
FIG. 16A-C are graphs illustrating printhead ink depositions.
Figure 16B:
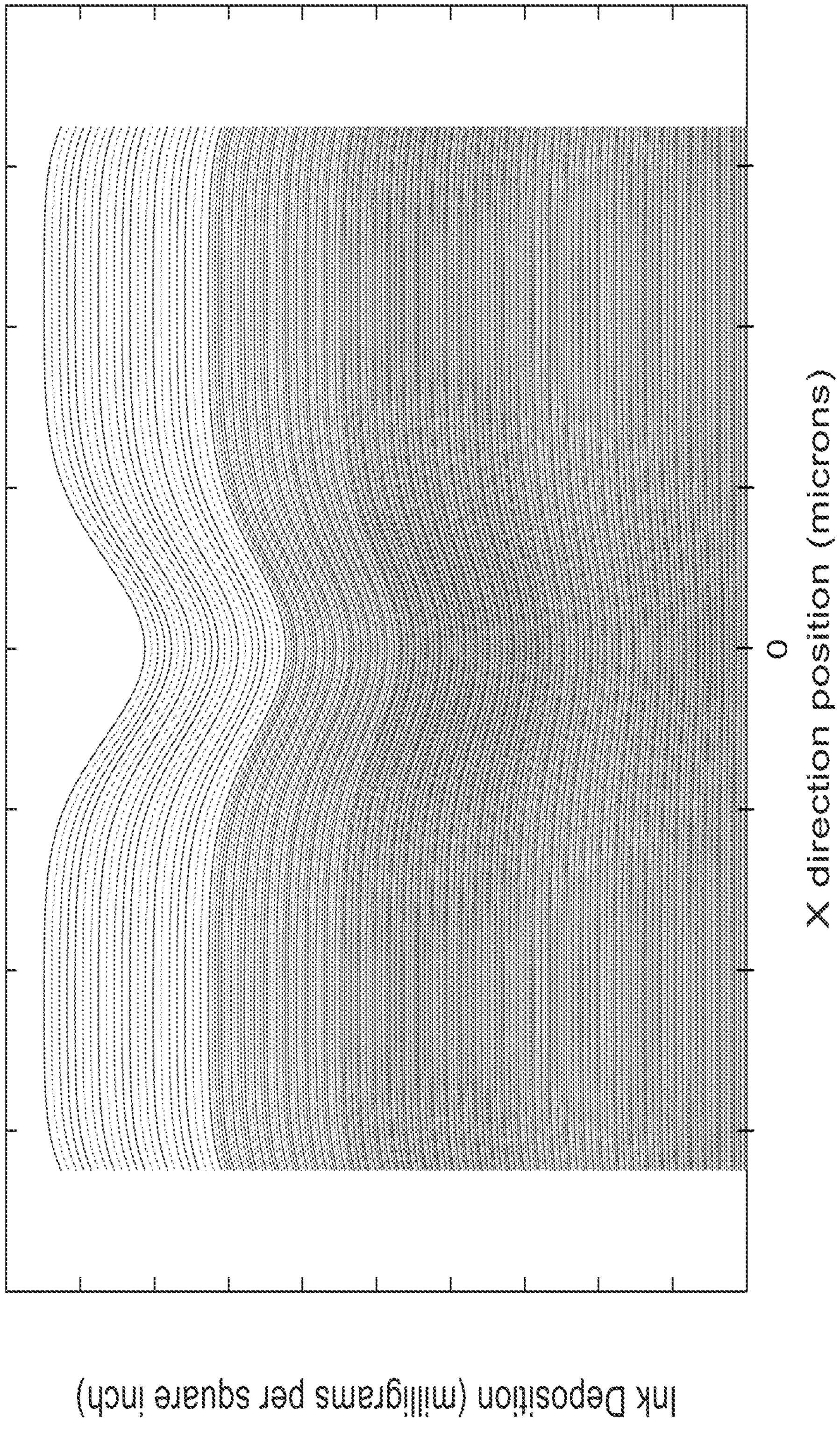
Figure 16C:
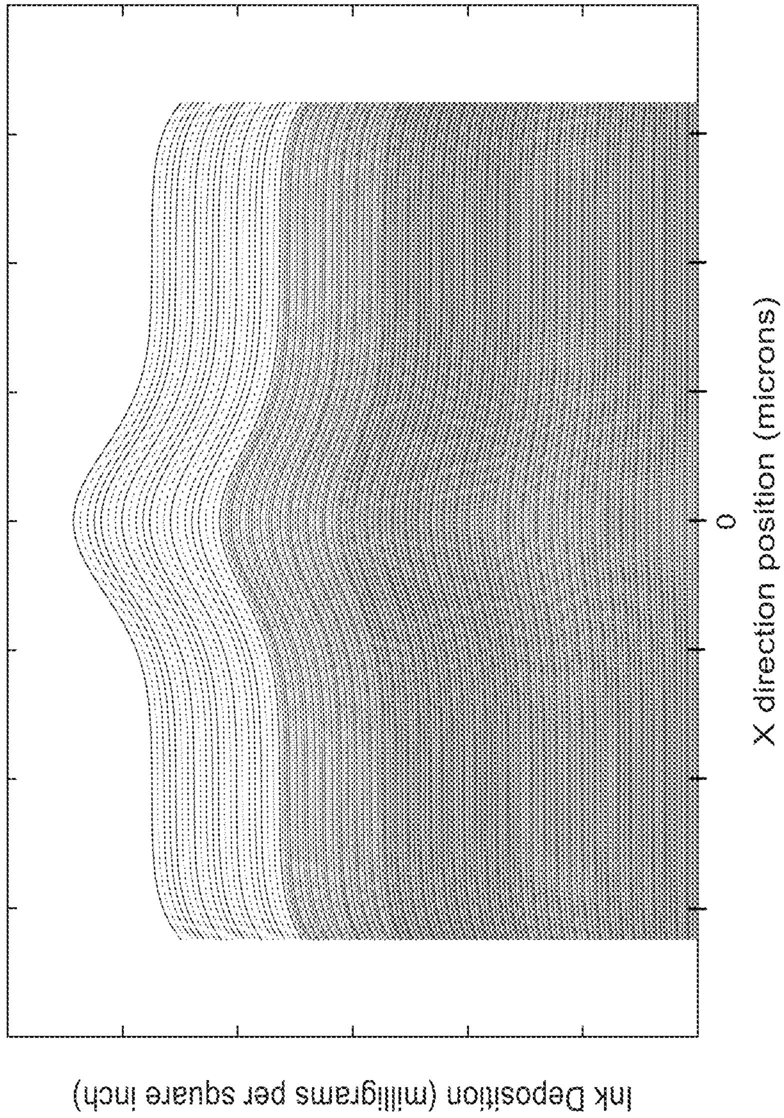

Compensation module 216 may also be implemented to perform compensation for overlapping pel forming elements 165 attributed to printhead overlap. Printhead overlap results from an incorrect spacing between adjoining printheads 162. This undesirable overlap may occur during manufacturing of the printer, after replacement of a printhead or some other physical change of the printhead. As used herein, overlap and gap are the distance between adjacent printheads that differs from the ideal printhead spacing distance. With ideal adjacent print head spacing, the resulting spacing between pel forming elements 162 for adjacent printheads is the same as spacing for pel forming elements 162 within the printheads. Ideal printhead spacing results in an overlap of zero and a gap of zero. Adjacent printheads that are spaced too far apart have negative overlap and positive gap. Adjacent printheads that are spaced too closely have positive overlap and negative gap. The region between adjacent printheads is referred to as gap region (i.e., overlap region). For example, FIGS. 16A-16C illustrate printhead overlap ink deposition scenarios without compensation. FIG. 16A illustrates total ink deposition without a printhead overlap (e.g., the overlap and gap are zero). FIG. 16B illustrates overlap ink deposition in which adjacent printheads 162 are too far apart (e.g., negative overlap or positive gap). As shown in FIG. 16B, an ink deposition deficiency is apparent at the x=0 position where pel forming elements 165 from different printheads 162 are too far apart.

FIG. 16C illustrates overlap ink deposition in which adjacent printheads 162 are too close together (e.g., positive overlap or negative gap). In this instance there is excess ink deposition at the x=0 position due to the pel forming elements 165 from different printheads 162 being too close. In these cases, the point x=0 is the mid-point between the last pel forming element of one printhead and the first pel forming element of a different printhead. All other pel forming elements in each of the two printheads are at their nominal spacings (e.g., nominal nozzle to nozzle spacing).

Figure 17:
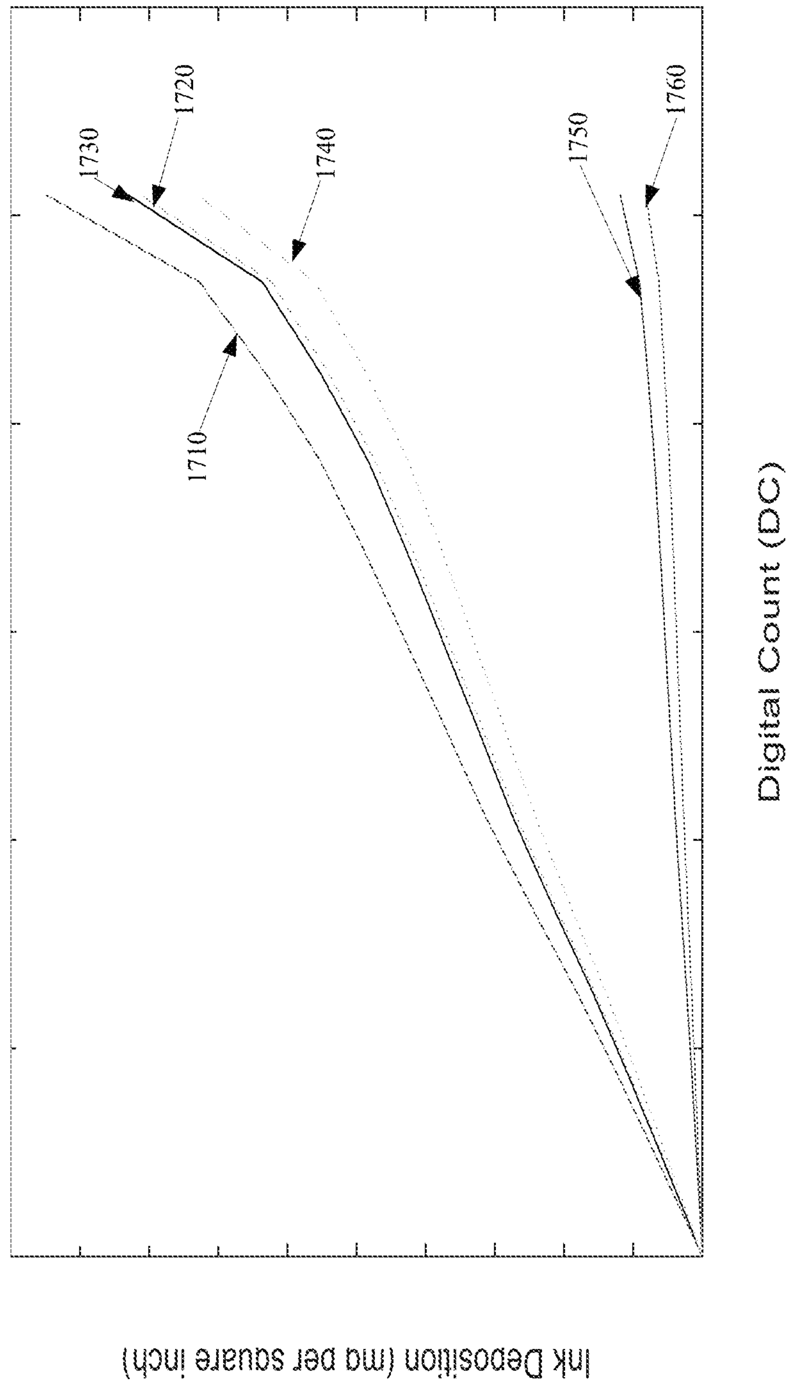
FIG. 17 is a graph illustrating ink deposition vs digital count without printhead overlap compensation.

FIG. 17 is a graph illustrating ink deposition vs digital count without printhead overlap compensation. Gaussian shaped ink deposition profiles are used to represent the ink depositions of each pel forming element. For simplicity, this example uses only a single local group, where the local group is composed of a single Gaussian shaped ink deposition profile to the left of the gap region and a single Gaussian shaped ink deposition profile to the right of the gap region FIG. 17 shows lines 1710, 1720, 1730, 1740, 1750 and 1760. Curves illustrate ink depositions for a location centered on a printhead gap region (e.g., x=0). Line 1710 indicates ink deposition without overlap for all pel forming elements 165, while line 1720 indicates ink deposition with overlap for all pel forming elements 165. (e.g., The overlap is negative and is formed by printheads that are too far apart). Line 1730 indicates ink deposition without overlap for pel forming elements 165 in local group 1, while line 1740 indicates ink deposition with overlap for pel forming elements 165 in local group 1. Similarly, line 1750 indicates ink deposition without overlap for pel forming elements 165 not in local group 1, while line 1760 indicates ink deposition with overlap for pel forming elements 165 not in local group 1. As shown, the ink deposition levels decreased comparing no overlap and overlap cases, due to the printhead separation being too far apart.

Overlap (e.g., gap) refers to the physical distance amount between the last pel forming element of one printhead and the first pel forming elements of the second adjacent printhead that differs from ideal, which in this case is larger than the nominal pel to pel element spacing within the printheads. Overlap can apply to the case where the last and first pel forming elements have spacing greater than or less than the nominal ideal pel to pel element spacing. In this case the ink depositions not in local group 1 are different for the cases with and without overlap. This is different than what occurs when jet-out depositions are determined, and occurs in this case due to the overlap having an impact on the ink depositions for the not in local group 1.

Figure 18:
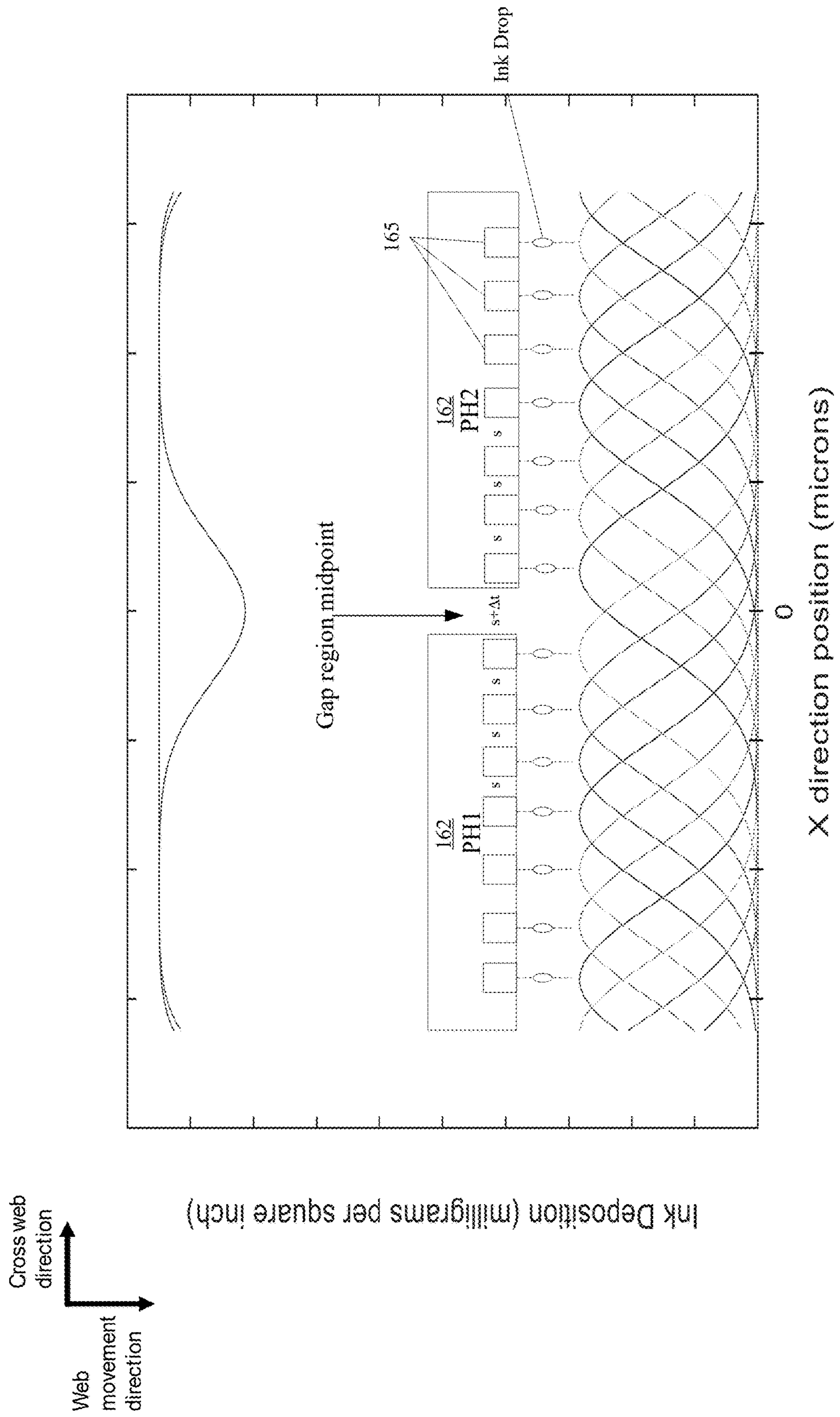
FIG. 18 is a graph illustrating ink deposition without printhead overlap compensation.

FIG. 18 is a graph illustrating printhead overlap ink deposition without compensation (e.g., printhead overlap compensation) for adjacent printheads 162 (PH1 and PH2) where the midpoint between pel forming elements for the two printheads (e.g., midpoint of the gap region) is defined to be at x=0 and the printheads are too far apart. The top (flat) line is the large-scale ink deposition. The middle line shows the total ink deposition with the valley corresponding to the gap between the two printheads. The family of curves at the bottom show the Gaussian shaped ink deposition profile for each of the ink jet nozzles, where each Gaussian shaped ink deposition profile is associated with a pel forming element 165. Each of the printheads 162 (PH1 and PH2) comprise pel forming elements 165 that are physically spaced apart a distance s (e.g., nominal spacing for pel forming elements 165) in the X direction. The physical distance amount between the outer pel forming element 165 of PH1 and the adjacent outer pel forming element PH2 is s plus delta t (e.g., Δt). In this example, overlapping pel forming elements 165 comprise pel forming elements in each of the adjacent printheads 162 (e.g., PH1 and PH2) that have the gap region with non-zero delta t. In this case, delta Δt is positive indicating that the two printheads are too far apart. As used herein, Δt is the equivalent of the gap. The nominal spacing between pel forming elements is s, which is equal to 1/DPI. DPI being the resolution of the printheads in dots per inch.

According to one embodiment, compensation module 216 is implemented to perform uniformity compensation to compensate for overlapping pel forming elements 165 at adjacent printheads 162. Similar to the discussion above with reference to jet-out compensation, compensation module 216 also generates transfer functions for each of a plurality of color planes (e.g., CMYK) to compensate for groups of overlapping pel forming elements 165. As a result, the transfer functions are generated based on ink deposition functions for groups of pel forming elements including overlapping pel forming elements 165 (e.g., those pel forming elements 165 having nominal spacing between adjacent pel forming elements 165 and are located on either of the two adjacent printheads).

In this embodiment, compensation module 216 generates first and second sets of transfer functions to compensate for overlapping pel forming elements 165, wherein each set of transfer functions is generated for a corresponding group of pel forming elements 165 based on ink deposition functions associated with the corresponding group and a joint target response. In such an embodiment, compensation module 216 generates the first and second sets of transfer functions by generating the first set of transfer functions (e.g. TF1) to compensate for the overlapping pel forming elements 165 based on first ink deposition functions (e.g., IDLG1OL) and third ink deposition functions (e.g., IDLGCOMP). Similarly, compensation module 216 generates a second set of transfer functions (e.g., TF2) to compensate for the gap region based on second ink deposition functions (e.g., IDLG2OL) and the third ink deposition functions. The first ink deposition functions correspond to a first local group of pel forming elements 165 including first overlapping pel forming elements. The second ink deposition functions correspond to a second local group of pel forming elements 165 including second overlapping pel forming elements. The third ink deposition functions correspond to the joint target response. The IDLG1OL ink deposition function is associated with two Gaussian shaped ink deposition profiles related to the overlapping pel forming elements 165. The elements of IDLG1OL have one element to the left and one element to the right of the gap region. Furthermore, the ink deposition function IDLG2OL is associated with two Gaussian shaped ink deposition profiles adjacent to the IDLG1OL Gaussian shaped ink deposition profiles. The IDLG2OL group is formed by an adjacent element to the left of the leftmost element forming IDLG1OL and an adjacent element to the right of the rightmost element forming IDLG1OL. In other words, the first local group includes the functioning pel forming elements 165 that are one pel away (left and right in the x-direction) from the gap region. Second local group includes functioning pel forming elements 165 that are two pels away (left and right in the x-direction) from the gap region. The first local group and second local group have no functioning pel forming elements 165 in common. In this case the first and second local groups refer to the pel forming elements 165 that will be used for the compensation. This for example might include two pel forming elements at the end of each printhead.

In an alternative embodiment, compensation module 216 may generate compensated halftones 220 to provide printhead overlap compensation. In such an embodiment, compensation module 216 generates first and second sets of inverse transfer functions (e.g., ITF1 and ITF2) to compensate for a gap region, wherein each set of inverse transfer functions is generated for a corresponding group of overlapping pel forming elements based on ink deposition functions associated with the corresponding group and a joint target response. The gap region is located between overlapping pel forming elements of the corresponding groups. In such an embodiment, compensation module 216 generates compensated halftones based on the first and second sets of inverse transfer functions. Similar to the discussion above, the halftone thresholds are modified by the inverse transfer functions such that the output ink amounts corresponding to modified halftone thresholds with the pel forming element artifacts and the output ink amounts corresponding to unmodified halftone thresholds without the pel forming element artifacts are substantially equal for a range of the input digital counts. In such an embodiment, the compensated halftones are generated by applying the first and second sets of inverse transfer functions to an uncompensated halftone design to modify halftone thresholds of the uncompensated halftone design.

In a further embodiment, generating the first and the second sets of inverse transfer functions comprises generating the first set of inverse transfer functions based on first ink deposition functions (e.g., IDLG1OL) and third ink deposition functions (e.g., IDLGCOMP) and generating the second set of inverse transfer functions based on second ink deposition functions (e.g., IDLG1OL) and the third ink deposition functions. The first ink deposition functions correspond to a first local group of pel forming elements including first overlapping pel forming elements, the second ink deposition functions correspond to a second local group of pel forming elements including second overlapping pel forming elements, and the third ink deposition functions correspond to the joint target response. The IDLG1OL ink deposition function is associated with two Gaussian shaped ink deposition profiles related to the overlapping pel forming elements 165. The elements of IDLG1OL have one element to the left and one element to the right of the gap region.

Furthermore, the ink deposition function IDLG2OL is associated with two Gaussian shaped ink deposition profiles adjacent to the IDLG1OL Gaussian shaped ink deposition profiles. The IDLG2OL group is formed by an adjacent element to the left of the leftmost element forming IDLG1OL and an adjacent element to the right of the rightmost element forming IDLG1OL. In other words, the first local group includes the functioning pel forming elements 165 that are one pel away (left and right in the x-direction) from the gap region. Second local group includes functioning pel forming elements 165 that are two pels away (left and right in the x-direction) from the gap region. The first local group and second local group have no functioning pel forming elements 165 in common. In this case the first and second local groups refer to the pel forming elements 165 that will be used for the compensation. This for example might include two pel forming elements at the end of each printhead.

According to one embodiment, the ink deposition computation logic 520 shown in FIG. 6 is also implemented to generate the IDLG1OL, IDLG2OL and IDNILGOL ink deposition functions. Additionally, ink deposition computation logic 520 generates ink deposition functions for local group 1 without overlapping pel forming elements 165 (IDLG1), local group 2 without overlapping pel forming elements 165 (IDLG2) and not in local group without overlapping pel forming elements 165 (IDNILG), which are used to generate the IDLG1OL, IDLG1OL and IDNILGOL ink deposition functions. Similar to as described above for jet-out compensation, profile generation engine 620 generates Gaussian shaped ink deposition profiles associated with the IDLG1, IDLG2, IDNILG, IDLG1OL, IDLG2OL and IDNILGOL groups of pel forming elements 165 based on the number of pel forming elements 165, resolution data 601 and standard deviations for the Gaussian profiles.

According to this embodiment, resolution data 601 also includes printhead overlap data (e.g., Δt) associated with the overlap of the printheads. Δt may be predetermined (e.g., based on physical measurements of adjacent printheads in a printhead array). The ink deposition function is obtained by summing the Gaussian shaped ink deposition profiles for each case.

The local group ID includes the depositions for pel forming elements 165 that will be modified using two separate TFs. The IDLG ink deposition level is the sum of local group 1 and local group 2 without an overlap. The ink deposition IDNILG includes the ink deposition from pel forming elements 165 without an overlap that are not members of local group 1 and 2 and will not be modified using the TF. The sum of the IDLG and IDNILG is the total ink deposition. The objective of print head overlap compensation is to achieve with TF compensation the steady state ink deposition at the center of the gap region location, where steady state refers to the level of ink deposition far away from the gap so that the gap does not have any influence on the ink deposition levels. In one embodiment, IDNILG is influenced by the print head gap due to the displacement of the pel forming element 165 locations of the not in local group. The ink deposition profile function for the not in local group nozzles with the influence of the printhead gap is IDNILGOL. Without the gap, the not in local group nozzles are in their nominal locations. The ink deposition computations account for this difference in the IDNILG resulting from the gap. The following computations are for a single ink color with a coordinate system X that denotes the locations of the pel forming elements/Gaussian shaped ink deposition profiles, assumed to be centered around the print head gap region (e.g., x=0). In addition, x locations are the points where ink deposition levels are computed.

As mentioned above, the sum of IDLG and IDNILG without the PH gap is equal to the total ink deposition IDtotal. Thus, $$\mathrm{IDLG}(0,\mathrm{DC})+\mathrm{IDNILG}(0,\mathrm{DC})=\mathrm{IDtotal}(0,\mathrm{DC})$$

Expanding the local group into two components, IDLG1 and IDLG2:

$$\mathrm{IDLG}(0,\mathrm{DC})=\mathrm{IDLG1}(0,\mathrm{DC})+\mathrm{IDLG2}(0,\mathrm{DC})$$

For the case without the print head gap, this results in:

$$\mathrm{IDLG1}(0,\mathrm{DC})+\mathrm{IDLG2}(0,\mathrm{DC}))+\mathrm{IDNILG}(0,\mathrm{DC})=\mathrm{IDtotal}(0,\mathrm{DC}),$$

where LG1 'Local group 1' is assumed to be formed by the nozzles immediately to the left and right of the PH gap region and LG2 'Local group 2' is assumed to be formed by the nozzles, one pel on each side of the PH gap region, further away.

Introducing the print head gap produces a separation of the pel forming elements 165, which alters the IDtotal and all of the individual components including the not in local group. OL denotes components that have an 'overlap'. Thus, the computation including the not in local group may be represented as:

$$\mathrm{IDLG1OL}(0,\mathrm{DC})+\mathrm{IDLG2OL}(0,\mathrm{DC}))+\mathrm{IDNILGOL}(0,\mathrm{DC})=\mathrm{IDtotalOL}(0,\mathrm{DC})$$

Introducing IDLGOL, these equations reduce to:

$$\mathrm{IDLGOL}(x,\mathrm{DC})=\mathrm{IDLG1OL}(x,\mathrm{DC})+\mathrm{IDLG2OL}(x,\mathrm{DC})$$

$$\mathrm{IDLGOL}(x,\mathrm{DC})+\mathrm{IDNILGOL}(x,\mathrm{DC})=\mathrm{IDtotalOL}(x,\mathrm{DC})$$

At location x=0, these equation become:

$$\mathrm{IDLGOL}(0,\mathrm{DC})=\mathrm{IDLG1OL}(0,\mathrm{DC})+\mathrm{IDLG2OL}(0,\mathrm{DC})$$

$$\mathrm{IDLGOL}(0,\mathrm{DC})+\mathrm{IDNILGOL}(0,\mathrm{DC})=\mathrm{IDtotalOL}(0,\mathrm{DC})$$

The components that will be modified by transfer functions are in the local groups. IDtotal represents the desired ink deposition level that occurs without the print head gap, where IDtotalOL has the influence of the gap. Introducing separate respective transfer functions for group 1 and group 2 and equating the total with TF compensation to the target ID (IDtotal) at x=0, restores ID to the original level, without the print head gap. IDtotalOL(0,255)<IDtotal(0,255), corresponds to the case when the print head gap is too large and IDtotalOL(0,255)>IDtotal(0,255) is when the PH gap is too small. Equating the sum of the not in local group ink deposition with a gap and the local group ink depositions, each having a gap and TF compensations, to the total ink deposition without a gap at x=0 results in:

$$\mathrm{IDLG1OL}(0,\mathrm{TF1}(\mathrm{DC}))+\mathrm{IDLG2OL}(0,\mathrm{TF2}(\mathrm{DC})))+\mathrm{IDNILGOL}(0,\mathrm{DC})=\mathrm{IDtotal}(0,\mathrm{DC})$$

$$\mathrm{IDLGCOMP}(0,\mathrm{DC})=\mathrm{IDLG1OL}(0,\mathrm{TF1}(\mathrm{DC}))+\mathrm{IDLG2OL}(0,\mathrm{TF2}(\mathrm{DC}))$$

$$\mathrm{IDLGCOMP}(0,\mathrm{DC})+\mathrm{IDNILGOL}(0,\mathrm{DC})=\mathrm{IDtotal}(0,\mathrm{DC})$$

As shown, IDLGCOMP is the sum of IDLG1OL and IDLG2OL with TF1 and TF2 applied. According to this equation and as explained further below, TF1 and TF2 are determined such that the total ink contributions from the compensated first and second local groups achieve a joint target response (e.g., ink deposition function IDLGCOMP). The joint target response comprises an ink deposition function.

Profile aggregation engine 630 aggregates the Gaussian shaped ink deposition profiles to generate local ink contribution data for each of the plurality of color planes by summing contributions of corresponding Gaussian shaped ink deposition profiles for all points x in the grid to generate the local ink contribution data (e.g., ink contribution data for the local groups) for each of the plurality of color planes, while ink deposition function generator 640 uses the large-scale ink deposition data to generate ink deposition functions associated with the IDLG, IDNILG, IDLG1OL, IDLG2OL and IDNILGOL groups (e.g., IDLG (x,DC), IDNILG (x,DC), IDLG1OL (x,DC), IDLG2OL (x,DC), and IDNILGOL(x,DC)) for each color plane. As a result, the same process to generate the ink deposition functions discussed above with reference to FIG. 7 is performed to generate and transmit the ink deposition functions for the printhead overlap embodiment. The large-scale ink deposition LID(DC) equals the sum of the ink depositions IDLG (x,DC) and IDNILG(x,DC) at the position x=0. This allows the determination of a scaling factor to be applied to each Gaussian shaped ink deposition profile so that the large-scale ink deposition vs DC is achieved when the Gaussian shaped ink deposition profiles are combined.

Compensation engine 530 also performs compensation attributed to printhead overlap based on the generated ink deposition functions, such that:

$$\mathrm{IDLG1OL}(0,\mathrm{TF1}(\mathrm{DC}))+\mathrm{IDLG2OL}(0,\mathrm{TF2}(\mathrm{DC}))=\mathrm{IDLGCOMP}(0,\mathrm{DC})=\mathrm{IDtotal}(0,\mathrm{DC})-\mathrm{IDNILGOL}(0,\mathrm{DC})$$

In one embodiment, a single compensated local group component is selected to solve for the transfer function by adding a simplifying assumption. Since the two compensated local group components added together equals a specific target ink deposition, a factor w is defined that is the fraction of the target ink deposition that will be achieved with compensation applied for that component. In this case group 1 with its corresponding TF1 is used. Alternately, group 2 with TF2 may be used. Group 1 has more available ink deposition, assuming a Gaussian shaped ink deposition profile, since it is nearest group to the print head gap region. Accordingly, $$IDLG1OL(0,TF1(DC))=w*(IDtotal(0,DC)-IDNILGOL(0,DC)).$$

Solving for TF1 at x=0 with weight factor w, $$TF1(DC)=IDLG1OL^{-1}(w*(IDtotal(0,DC)-IDNILGOL(0,DC)))$$

$$TF1(DC)=IDLG1OL^{-1}(w*IDLGCOMP(0,DC).$$

Interpreting this result, assuming a calibration model, w*IDLGCOMP is the target/desired function to achieve with calibration from TF1, while $IDLG1OL^{-1}$ is the inverse function of the measured/available ID.

In embodiments, two options exist for computing TF2. Method 1 employs a residual ink deposition after TF1 is applied, while method 2 uses the ID target based on w factor. For method 1, given:

$$IDLG1OL(0,TF1(DC))+IDLG2OL(0,TF2(DC))=IDtotal(0,DC)-IDNILGOL(0,DC);$$

$$IDLG2OL(0,TF2(DC))=IDtotal(0,DC)-(IDNILGOL(0,DC)+IDLG1OL(0,TF1(DC)));$$

Introducing IDTF1, which is the sum of IDNILGOL and IDLG1OL at location x=0 with TF1 applied:

$$IDTF1(0,DC)=IDNILGOL(0,DC)+IDLG1OL(0,TF1(DC))$$

$$TF2(DC)=IDLG2OL^{-1}(IDtotal(0,DC)-(IDNILGOL(0,DC)+IDLG1OL(0,TF1(DC))))$$

$$TF2(DC)=IDLG2OL^{-1}(IDtotal(0,DC)-IDTF1(0,DC)).$$

Interpreting this result, assuming a calibration model, (IDtotal(0,DC)−IDTF1(0,DC)) is the target/desired function to achieve with calibration from TF2, while $IDLG2OL^{-1}$ is the inverse function of the measured/available ID.

For method 2, assuming w*(IDtotal(0,DC)−IDNILGOL(0,DC)) is the target for TF1, then (1−w)*(IDtotal(0,DC)−IDNILGOL(0,DC)) is the balance of ID that forms the target for TF2, such that:

$$IDLG2OL(0,TF2(DC))=(1-w)*(IDtotal(0,DC)-IDNILGOL(0,DC)); \text{ and}$$

$$TF2(DC)=IDLG2OL^{-1}((1-w)*(IDtotal(0,DC)-IDNILGOL(0,DC))).$$

Interpreting this result, assuming a calibration model, ((1−w)*(IDtotal(0,DC)−IDNILGOL(0,DC))) is the target/desired function to achieve with calibration from TF2, while $IDLG2OL^{-1}$ is the inverse function of the measured/available ID. As shown, each set of transfer functions (e.g., TF1, TF2, TF3) is generated based on weighted contributions to the joint target response. A resulting technical benefit of applying the weighting factor is that the sets of transfer functions and the resulting compensations for the different local groups may be different and the compensations may be further refined.

In the case of inverse transfer functions for overlap compensation, TF1 and TF2 are derived initially based on the selected w factor (e.g., weighting factor). ITF1 and ITF2 are then derived from the inverse functions of TF1 and TF2 respectively. The ITFs may be generated based on the TFs determined using either of the methods described (e.g., method 1 or method 2). As shown, each set of inverse transfer functions (e.g., ITF1, ITF2, ITF3) is generated based on weighted contributions to the joint target response. A resulting technical benefit of applying the weighting factor is that the sets of inverse transfer functions and the resulting compensations for the different local groups may be different and the compensations may be further refined.

While the provided solutions use a value of x=0, that is not the only solution. Alternate x locations may be used for the component and/or the target ID or the IDs. Alternately, ID for multiple x locations may be combined (e.g., mean ID) to determine a single compensated or target ID to use in the equations.

In one embodiment, the ID for all positions x at level 255 with the PH gap form an "upper limit" that may be achieved with compensation. This is because all nozzles at this level are already operating at level 255 and no further boost from a TF is possible. As discussed above, additional ink may be obtained to fill the ID "valley" for the case when the PH gap is too large by using headroom provided by larger drop sizes or using additional ink remaining after large-scale calibration.

According to one embodiment, a third set of transfer functions (e.g., TF3) may be generated to use ID headroom from calibration to achieve the technical benefit of further improvement/refinement of the PH overlap compensation. In such an embodiment, TF3 is used to calibrate the contone data associated with the Gaussian shaped ink deposition profiles for the IDNILG group. This includes pels 3 pels and further away on both sides from the PH gap region center. In a further embodiment, the four Gaussian shaped ink deposition profiles in the local groups 1 and 2 are compensated by changes to the contone levels using TF1 and TF2. As discussed above, a steady state region of the NILG profile (DNILGSS) is generated at ink deposition logic 520, which is used as the measured response for the TF3 derivation. TF3 is derived to achieve linear ID for that region and also forms the target for the PH gap region with compensation. The target linear ID is defined as an ID max value established based on the ID in the PH gap region with the PH gap, where ID_Knockdown is an ID level that is used to reduce the total ID in the PH gap at x=0 to form a new target ID level. ID at x=0 and DC=255:

$$IDLG1OL(0,255)+IDLG2OL(0,255)+IDNILGOL(0,255)$$

Subtracting the ID_knockdown from the total ID at x=0 provides the ID max for the linear ID target response:

$$IDmax=IDLG1OL(0,255)+IDLG2OL(0,255)+IDNILGOL(0,255)-ID\_Knockdown.$$

Defining a target linear response vs DC having a max ID at level 255 equal to IDmax results in:

$$IDlinear(DC)=(IDmax*DC)/255$$

Given the target response is IDlinear(DC) and measured steady state response is IDNILGSS, TF3 and ITF3 are determined to achieve target linear ID at the Steady State ID location (SSloc):

$$IDNILGSS(DC)=IDNILG(SSloc,DC)$$

$$TF3=IDNILGSS^{-1}(IDlinear(DC))$$

$$ITF3=IDlinear^{-1}(IDNILGSS(DC))$$

Where TF3 is used to compensate contone DC levels for image data that is not associated with the Gaussian shaped ink deposition profiles in the two local groups, to achieve calibration to linear ID for the not in local group nozzles (e.g., pels). Alternately ITF3 is employed to modify the threshold levels in the halftone threshold array for columns of data that are not associated with Gaussian shaped ink deposition profiles in the two local groups, to achieve halftone calibration to linear ID for the not in local group nozzles. The IDs for the not in local group, without and with the PH gap, are redefined to account for the calibration. Using TF3, the new IDNILG and IDNILGOL are computed as:

$$IDNILG(x,DC)=IDNILG(x,TF3(DC))$$

$$IDNILGOL(x,DC)=IDNILGOL(x,TF3(DC))$$

In one embodiment, the IDs for the Gaussian shaped ink deposition profiles that are in local group 1 and 2 are not recalibrated. The reason is that the full amount of ink that is available without Linear ID calibration is made available for the PH overlap compensation. In a further embodiment, the target ID in the gap region with compensation is redefined to account for the calibration to linear ID by redefining IDtotal:

$$IDtotal(0,DC)=IDlinear(DC)$$

Using the redefined IDs described above for IDtotal(0,DC), TF1 and ITF1 are computed employing T1 as an intermediate function. Where TF1 is the TF for group 1 that includes linear ID calibration. The equations for TF1 and ITF1 employ the previous equations except they use a modified target function T1 that employs the IDlinear calibration function:

$$T1(DC)=w*(IDtotal(0,DC)-IDNILGOL(0,DC))=w*(IDlinear(0,DC)-IDNILGOL(0,DC))$$

$$TF1(DC)=IDLG1OL^{-1}(T1(DC)) \text{ and}$$

$$ITF1(DC)=T1^{-1}(IDLG1OL(DC))$$

Subsequently, T2 is computed as:

$$T2(DC)=(IDtotal(0,DC)-(IDNILGOL(0,DC)+IDLG1OL(0,TF1(DC))))=(IDlinear(0,DC)-(IDNILGOL(0,DC)+IDLG1OL(0,TF1(DC))))$$

Or alternately:

$$T2(DC)=((1-w)*(IDtotal(0,DC)-IDNILGOL(0,DC)))=((1-w)*(IDlinear(0,DC)-IDNILGOL(0,DC)))$$

TF2 and ITF2 are solved as:

$$TF2(DC)=IDLG2OL^{-1}(T2(DC)) \text{ and}$$

$$ITF2(DC)=T2^{-1}(IDLG2OL(0,DC))$$

Additionally, the contone DC levels in image(columns) are modified as follows:

Image(local group 1 columns)=TF1(Image(local group 1 columns))

Image(local group 2 columns)=TF2(Image(local group 2 columns))

Image(Not in local group 1 or 2 columns)=TF3(Image(Not in local group 1 or 2 columns)).

In an alternative embodiment, compensation engine 530 performs printhead overlap compensation by using halftone generation logic 820 to generate compensated halftones. As discussed above, the compensated halftones (CompensatedTA) are generated for each color plane X and drop size Z, by modifying the thresholds in an un-compensated halftone design (UnCompensatedTA) at specific columns adjacent to the gap region (e.g., the region between the single pel at the end of each printhead in the case where two pels are compensated).

CompensatedTA_X_Z(local group 1 columns)=ITF1(UnCompensatedTA_X_Z(local group 1 columns))

CompensatedTA_X_Z(local group 2 columns)=ITF2(UnCompensatedTA_X_Z(local group 2 columns))

CompensatedTA_X_Z(Not in local group 1 or 2 columns)=ITF3(UnCompensatedTA_X_Z(Not in local group 1 or 2 columns)).

In the case of threshold array compensation, thresholds for all color planes and drop sizes are modified using ITF1, ITF2 and ITF3 for the columns of threshold array data associated with the jets printing in the PH gap region. Where ITF1 is used to modify the thresholds in columns immediately to the left and right of the PH gap region associated with the group 1 profiles. ITF2 is used to modify the thresholds in columns immediately to the left and right of the ITF1 modified columns, one pel further away from the PH gap region. ITF3, if calibration is employed, is used to modify all columns of threshold data that were not transformed by the ITF1 and ITF2 modifications.

In one embodiment, the transfer function and halftone printhead overlap compensation processes are performed via processes similar to those discussed above with reference to FIG. 9 and FIG. 10, respectively.

Figure 19A:
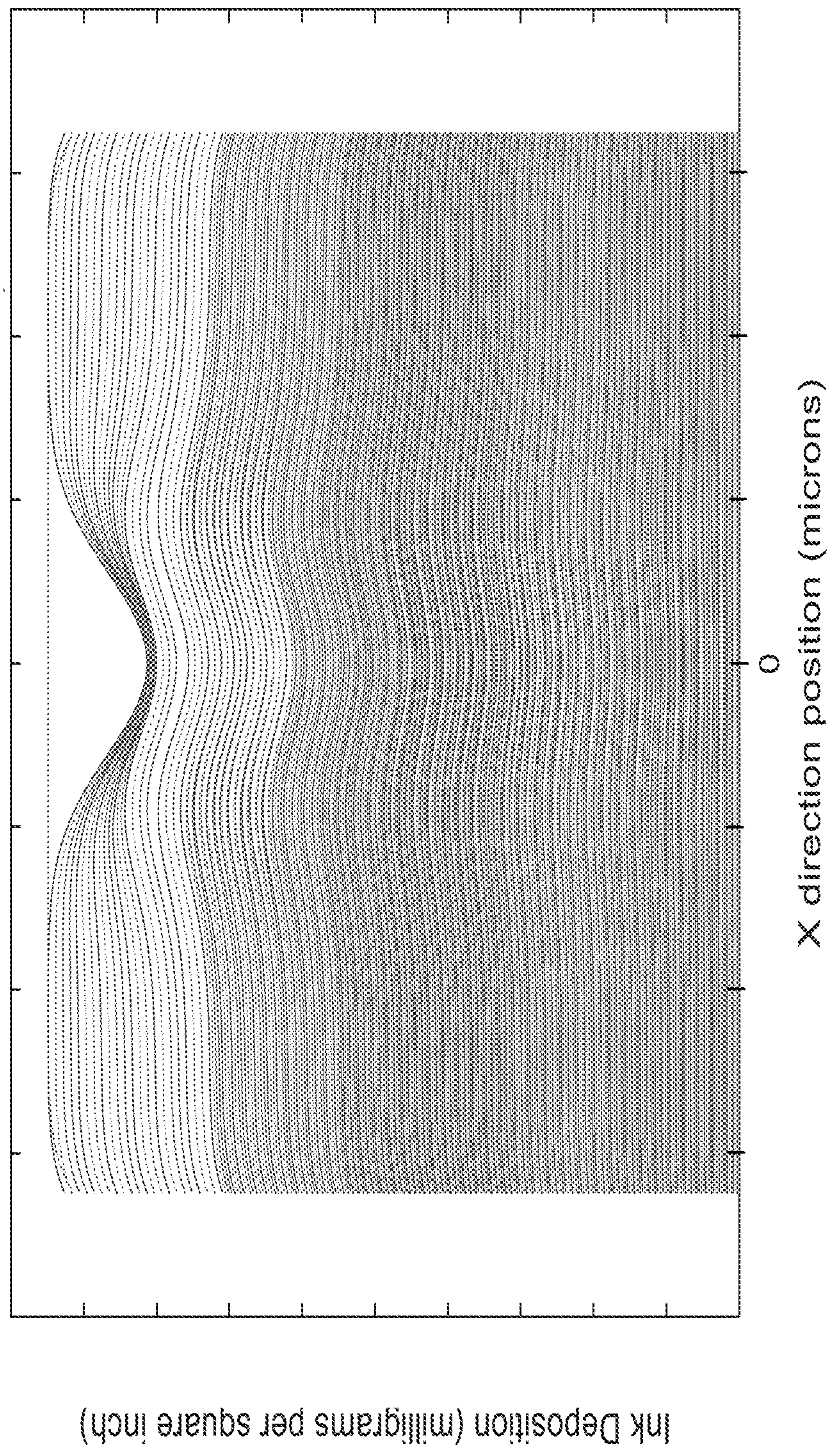
FIG. 19A-C are graphs illustrating ink deposition with printhead overlap compensation.
Figure 19B:
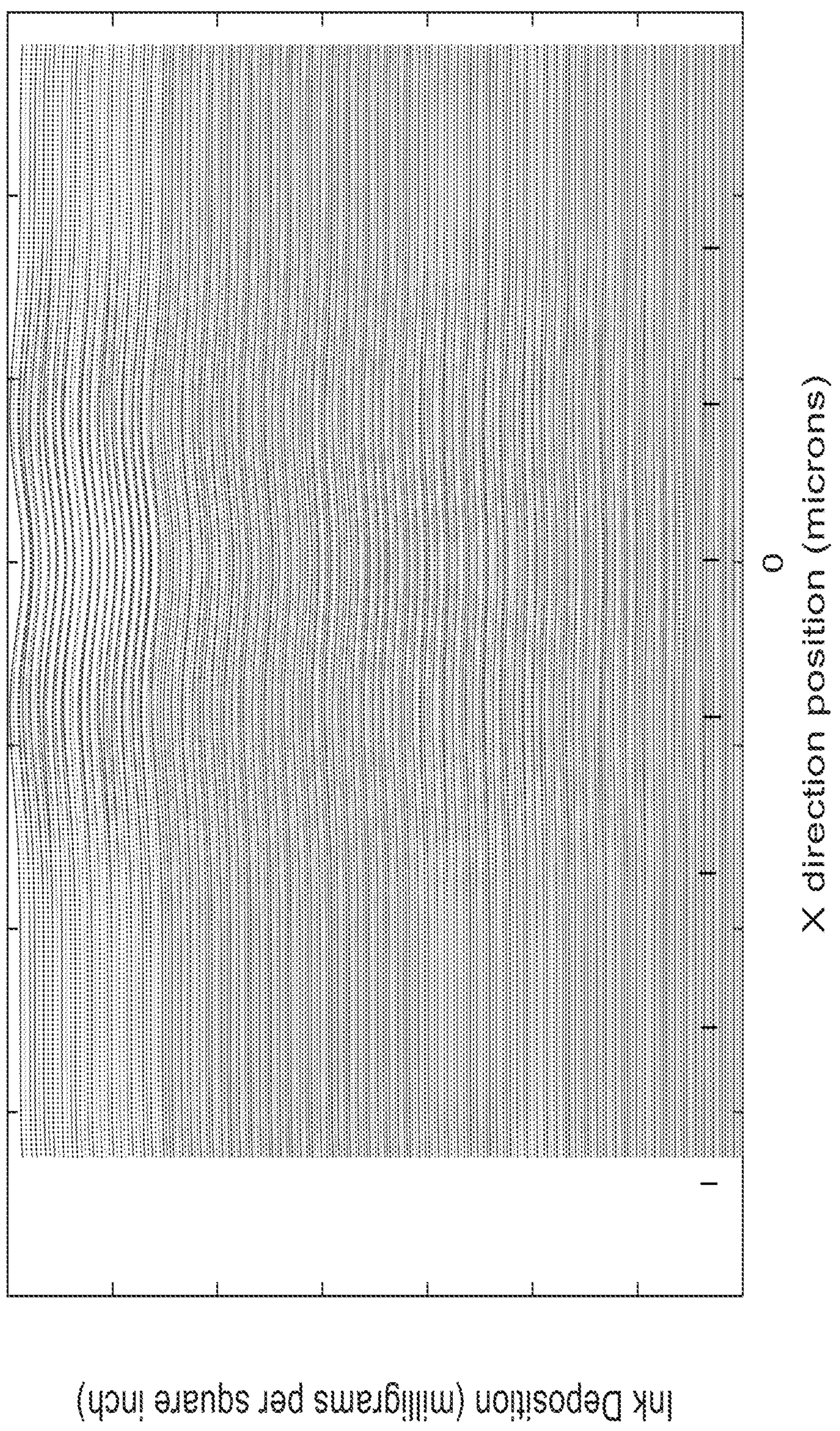
Figure 19C:
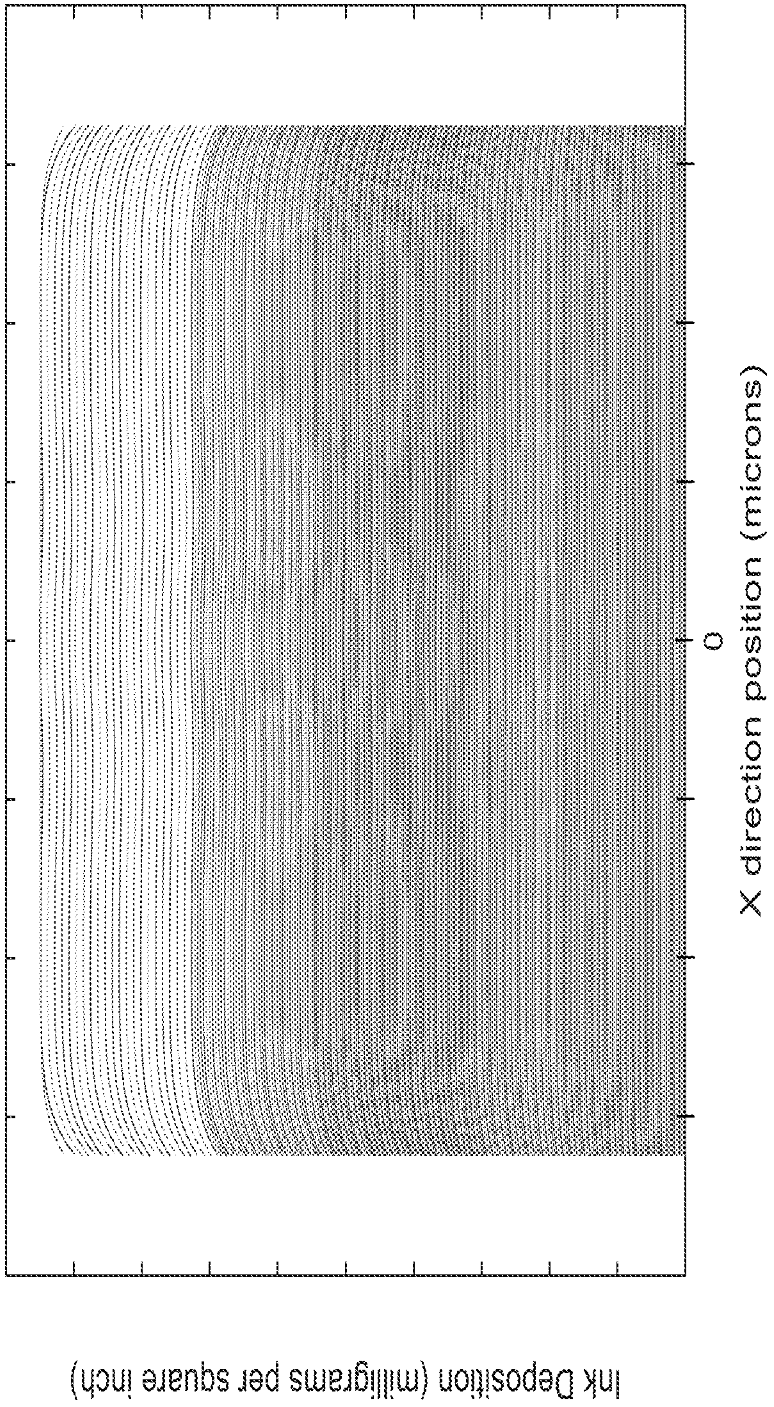

FIGS. 19A-19C are graphs illustrating compensation of pel forming elements 165 attributed to printhead overlap. FIG. 19A illustrates ink deposition overlap compensation for the scenario in which adjacent printheads 162 are too far apart. As shown in FIG. 19A, the valley area has been altered at position x=0, as compared to shown in FIG. 16B. The ink deposition at x=0 has been boosted to match the ink deposition for steady state regions where the spacing between pel forming elements is nominal. FIG. 19B illustrates results with PH gap and two TF compensation after Linear ID calibration. In this case the ink deposition levels are reduced due to the linear ID calibration, however the uniformity of the ID has been improved (flattened in the PH gap region) as a result of the compensation. FIG. 19C illustrates compensation for the scenario in which adjacent printheads 162 are too close together (e.g., delta t is negative). As shown in FIG. 19C, the excess ink deposition at position x=0 has been effectively eliminated, as compared to shown in FIG. 16C. A reduction of the ID may not be required using calibration in the case of the printheads too close, since an excess of ID is present and only multiple TF compensation can be used.

Figure 20:
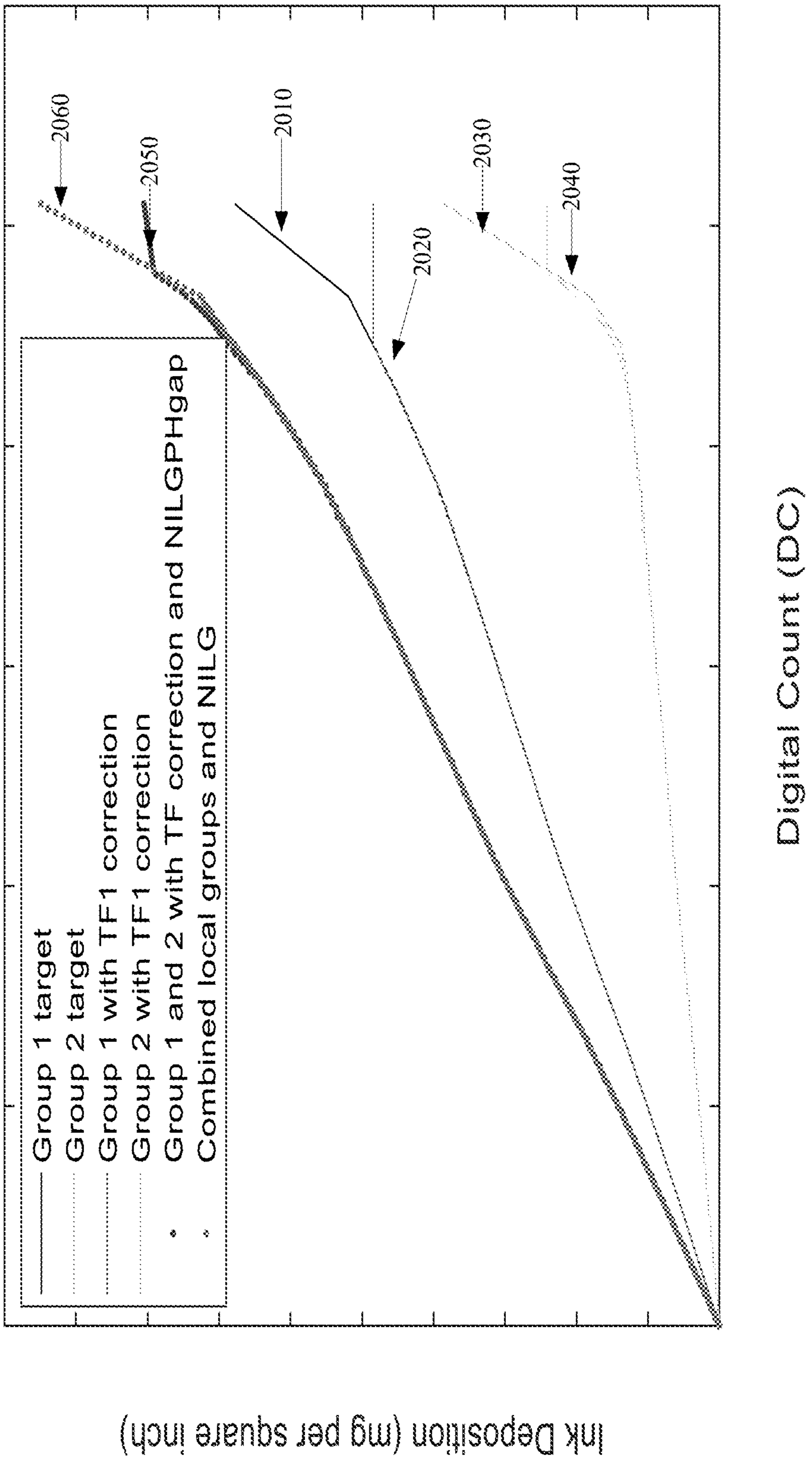
FIG. 20 is a graph illustrating ink deposition vs digital count with printhead overlap compensation.

FIG. 20 is a graph illustrating ink deposition vs digital count with printhead overlap compensation. This illustrates the degree of PH gap compensation that is possible for the component and combined groups. FIG. 20 shows lines 2010-2060. Line 2010 indicates the target ink deposition for group 1, while line 2020 indicates group 1 with TF1 compensation. Line 2030 indicates the target ink deposition for group 2, while line 2040 indicates group 1 with TF1 compensation. Line 2050 indicates group 1 and group 2 with TF compensation and NILG with a PH gap, while line 2060 shows the combined local groups and NILG without a PH gap. As shown, the compensated ink depositions each match the target ink depositions up to a threshold digital count level.

Figure 21:
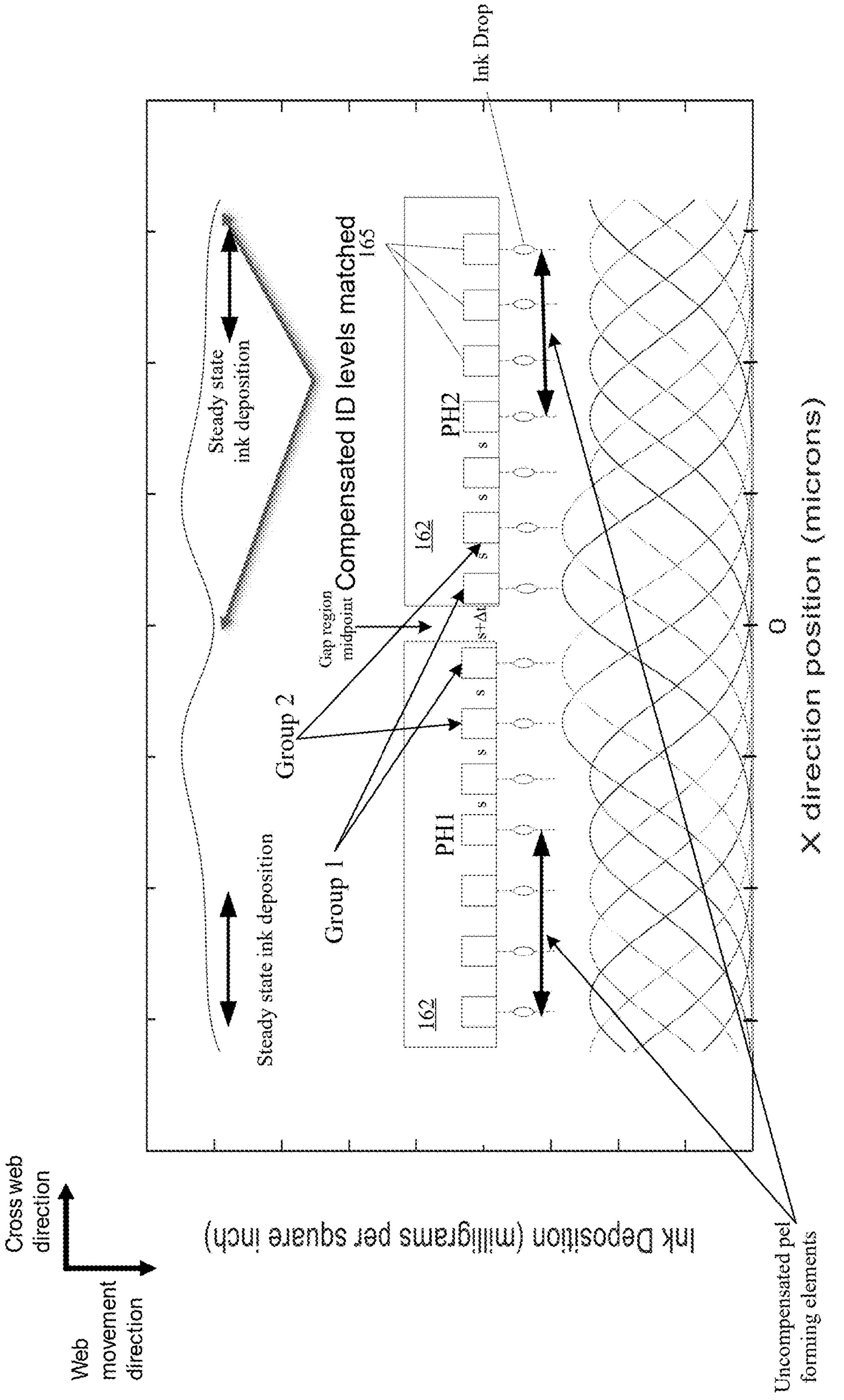
FIG. 21 is a graph illustrating ink deposition with printhead overlap compensation.

FIG. 21 illustrates one embodiment of a compensation of columns of threshold data relative to the location of a gap region of pel forming elements 165 between two adjacent printheads 162 (e.g., PH1 and PH2). In this example the midpoint between two pel forming elements at the edges of two adjacent printheads (e.g., midpoint of the gap region) is located at the middle of the plotted data (e.g., position x=0). Four Gaussian shaped ink deposition profiles have been boosted, two on each side of the midpoint, to compensate for the missing ink deposition (e.g., the valley) created by the overlap (e.g., printheads too far apart). The level applied to these four compensated nozzles at each DC is obtained from the transfer functions generated from the ink deposition functions. While the levels of the four boosted Gaussian shaped ink deposition profiles are shown equal for simple illustration purposes, the levels need not be the same (e.g., as noted above, the compensation for each nozzle group may be different).

The group 1 Gaussian shaped ink deposition profiles include the Gaussian shaped ink deposition profiles immediately to the left and right of the gap region (x=0) while the group 2 Gaussian shaped ink deposition profiles are the Gaussian shaped ink deposition profiles one pel further to the left and right of the group 1 Gaussian shaped ink deposition profiles. TF1 is associated with the group 1 Gaussian shaped ink deposition profiles and TF2 is associated with the group 2 Gaussian shaped ink deposition profiles. TF1 is used to transform contone data being printed by the group 1 Gaussian shaped ink deposition profiles and TF2 is used to transform contone data being printed by the group 2 Gaussian shaped ink deposition profiles. The remaining Gaussian shaped ink deposition profiles which are not members of group 1 and group 2 are transformed by TF3 in the case where linear ID calibration is also employed. The curve at the top illustrates that the boosted output from four nozzles provided an increased ink deposition so that the level in the "valley" at the PH gap region location is equal to the ink deposition outside the jet-out region (e.g., near the edges). Without the PH gap compensation the set of Gaussian shaped ink deposition profiles will all be the same and there will not be a boost.

According to one embodiment, verification engine 540 applies compensation data to each of the color planes to generate compensated ink deposition functions. Similar to the discussion above, verification engine 540 applies the generated transfer functions to the ink deposition functions data to generate combined compensation ink deposition functions (e.g., fourth ink deposition functions) that are compared to the large-scale ink deposition LID(DC). Additionally, application engine 1410 compares the combined compensation ink deposition functions to the IDLGOL ink deposition function to determine a difference and verify whether the difference between the combined compensation deposition functions and the uncompensated ink deposition function is within a predetermined threshold. In a further embodiment, application engine 1410 validates an acceptable compensation upon determining that the difference is within the predetermined threshold.

In an embodiment in which inverse transfer functions are employed, ITF1 is associated with the group 1 Gaussian shaped ink deposition profiles and ITF2 is associated with the group 2 Gaussian shaped ink deposition profiles. ITF1 is used to transform the columns of threshold array data associated with group 1 halftoned pels. ITF2 is used to transform the columns of threshold array data associated with group 2 halftoned pels. The remaining columns of threshold data which are not members of group 1 and group 2 are transformed by ITF3 in the case where linear ID calibration is also employed. These ITFs have associated ink deposition curves related to them, which in a similar manner as TFs, modify the output from four nozzles providing increased ink deposition so that the level in the "valley" at the PH gap region location is equal to the ink deposition outside the jet-out region (e.g., near the edges).

According to one embodiment, verification engine 1410 transforms thresholds for the uncompensated halftones for each of the color planes to generate compensated halftones that achieve compensated ink deposition functions. Verification engine 1410 applies the generated inverse transfer functions to the uncompensated halftones to achieve compensated ink deposition functions that when combined generate combined compensation ink deposition functions (e.g., fourth ink deposition functions) that are compared to the large-scale ink deposition LID(DC). Additionally, application engine 1410 compares the combined compensation ink deposition functions to the IDLGOL ink deposition function to determine a difference and verify whether the difference between the combined compensation deposition functions and the uncompensated ink deposition function is within a predetermined threshold. In a further embodiment, application engine 1410 validates an acceptable compensation upon determining that the difference is within the predetermined threshold.

While various processes shown herein may be applied to each of a plurality of color planes, it is understood that the various processes may be applied to one or more color planes that are of interest. For example, one or more color planes of interest may be the one or more color planes associated with the functioning pel forming elements 165 or the overlapping pel forming elements 165 explained above.

Figure 22:
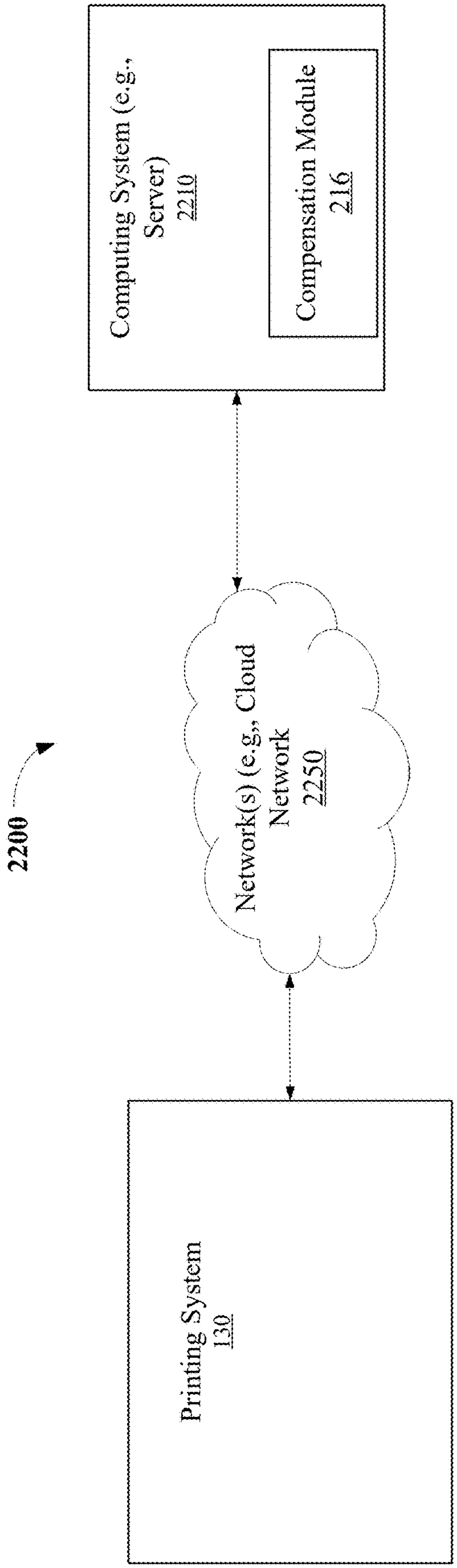
FIG. 22 illustrates one embodiment of a compensation module implemented in a network.

Although shown as a component of print controller 140, other embodiments may feature compensation module 216 included within an independent device, or combination of devices, communicably coupled to print controller 140. For instance, FIG. 22 illustrates one embodiment of a compensation module 216 implemented in a network 2200. As shown in FIG. 22, compensation module 216 is included within a computing system 2210 and transmits compensated halftones and/or transfer functions to printing system 130 via a cloud network 2250. Printing system 130 receives compensated halftones and/or transfer functions.

Figure 23:
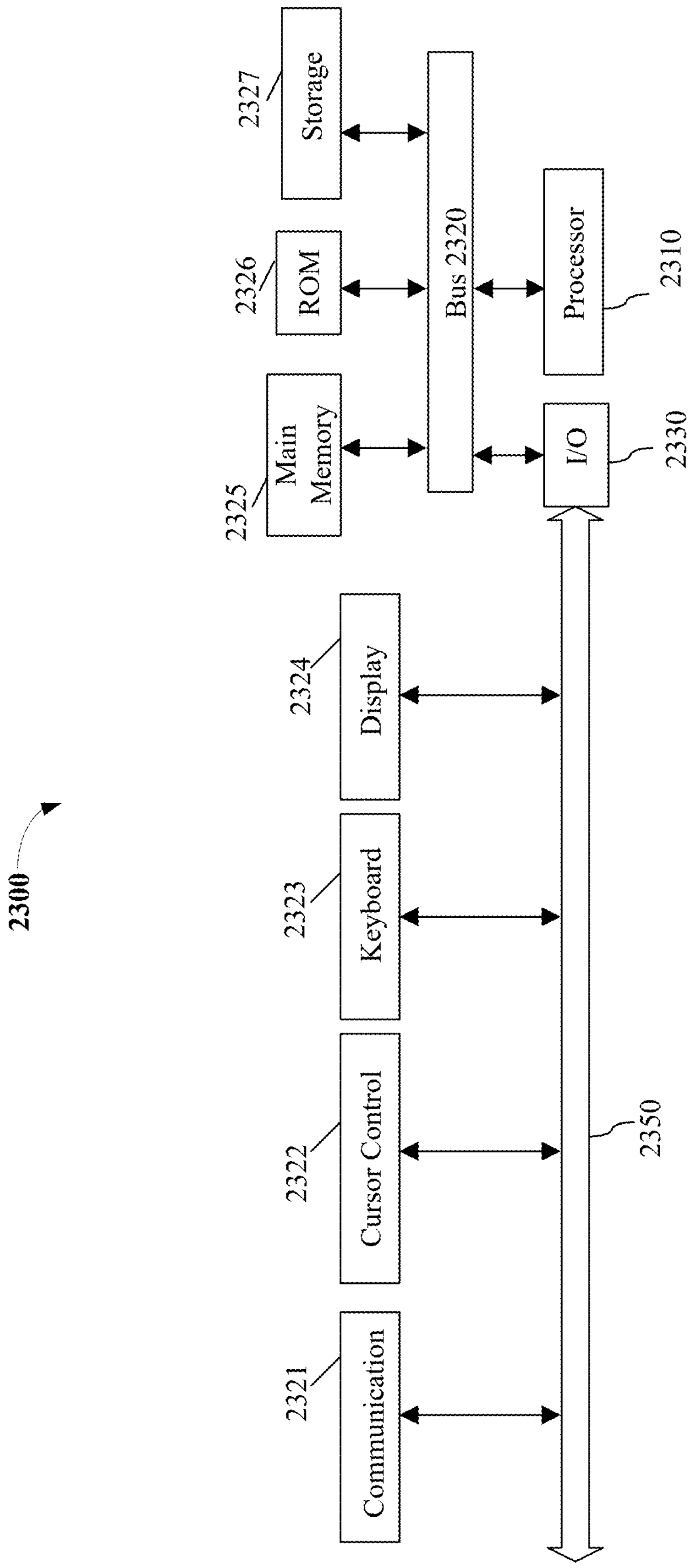
FIG. 23 illustrates one embodiment of a computer system.

FIG. 23 illustrates a computer system 2300 on which printing system 130 and/or compensation module 216 may be implemented. Computer system 2300 includes a system bus 2320 for communicating information, and a processor 2310 coupled to bus 2320 for processing information.

Computer system 2300 further comprises a random-access memory (RAM) or other dynamic storage device 2325 (referred to herein as main memory), coupled to bus 2320 for storing information and instructions to be executed by processor 2310. Main memory 2325 also may be used for storing temporary variables or other intermediate information during execution of instructions by processor 2310. Computer system 2300 also may include a read only memory (ROM) and or other static storage device 2326 coupled to bus 2320 for storing static information and instructions used by processor 2310.

A data storage device 2327 such as a magnetic disk or optical disc and its corresponding drive may also be coupled to computer system 2300 for storing information and instructions. Computer system 2300 can also be coupled to a second I/O bus 2350 via an I/O interface 2330. A plurality of I/O devices may be coupled to I/O bus 2350, including a display device 2324, an input device (e.g., an alphanumeric input device 2323 and or a cursor control device 2322). The communication device 2321 is for accessing other computers (servers or clients). The communication device 2321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store compensation logic and one or more processors coupled with the at least one physical memory device to execute the compensation logic to generate first and second sets of inverse transfer functions to compensate for a gap region, wherein each set of inverse transfer functions is generated for a corresponding group of overlapping pel forming elements based on ink deposition functions associated with the corresponding group and a joint target response, wherein the gap region is located between overlapping pel forming elements of the corresponding groups and generate compensated halftones based on the first and second sets of inverse transfer functions.

Example 2 includes the subject matter of Example 1, wherein the compensated halftones are generated by applying the first and second sets of inverse transfer functions to an uncompensated halftone design to modify halftone thresholds of the uncompensated halftone design.

Example 3 includes the subject matter of Examples 1 and 2, wherein generating the first and the second sets of inverse transfer functions comprises generating the first set of inverse transfer functions based on first ink deposition functions and third ink deposition functions and generating the second set of inverse transfer functions based on second ink deposition functions and the third ink deposition functions; wherein the first ink deposition functions correspond to a first local group of pel forming elements including first overlapping pel forming elements, the second ink deposition functions correspond to a second local group of pel forming elements including second overlapping pel forming elements, and the third ink deposition functions correspond to the joint target response.

Example 4 includes the subject matter of Examples 1-3, wherein the overlapping pel forming elements in the first local group comprise first overlapping pel forming elements adjacent to the gap region and the pel forming elements in the second local group comprise second overlapping pel forming elements adjacent to the first overlapping pel forming elements.

Example 5 includes the subject matter of Examples 1-4, wherein generating the first, second and third ink deposition functions comprises generating a first Gaussian shaped ink deposition profile associated with the first local group, generating a second Gaussian shaped ink deposition profile associated with the second local group of pel forming elements and generating a third Gaussian shaped ink deposition profile associated with the joint target response.

Example 6 includes the subject matter of Examples 1-5, wherein generating the first, second and third ink deposition functions further comprises combining the first, second and third Gaussian shaped ink deposition profiles.

Example 7 includes the subject matter of Examples 1-6, wherein an ink deposition function further comprises a function of a pel forming element position and input digital count.

Example 8 includes the subject matter of Examples 1-7, wherein the compensation logic applies the first and second sets of inverse transfer functions to generate fourth ink deposition functions, verifies whether a difference between the fourth ink deposition functions and large-scale ink deposition functions is within a predetermined threshold and validates an acceptable compensation upon determining that the difference is within the predetermined threshold.

Example 9 includes the subject matter of Examples 1-8, further comprising a print engine comprising a plurality of pel forming elements.

Example 10 includes the subject matter of Examples 1-9, wherein inverse transfer functions transform output digital counts, and the ink deposition functions represent output ink amount versus input digital count.

Example 11 includes the subject matter of Examples 1-10, wherein each corresponding group has no overlapping pel forming element in common.

Example 12 includes the subject matter of Examples 1-11, wherein each set of inverse transfer functions is generated based on weighted contributions to the joint target response.

Some embodiments pertain to Example 13 that includes a method comprising generating first and second sets of inverse transfer functions to compensate for a gap region, wherein each set of inverse transfer functions is generated for a corresponding group of overlapping pel forming elements based on ink deposition functions associated with the corresponding group and a joint target response; wherein the gap region is located between overlapping pel forming elements of the corresponding groups and generating compensated halftones based on the first and second sets of inverse transfer functions.

Example 14 includes the subject matter of Example 13, wherein the compensated halftones are generated by applying the first and second sets of inverse transfer functions to an uncompensated halftone design to modify halftone thresholds of the uncompensated halftone design.

Example 15 includes the subject matter of Examples 13 and 14, wherein generating the first and the second sets of inverse transfer functions comprises generating the first set of inverse transfer functions based on first ink deposition functions and third ink deposition functions and generating the second set of inverse transfer functions based on second ink deposition functions and the third ink deposition functions; wherein the first ink deposition functions correspond to a first local group of pel forming elements including first overlapping pel forming elements, the second ink deposition functions correspond to a second local group of pel forming elements including second overlapping pel forming elements, and the third ink deposition functions correspond to the joint target response.

Example 16 includes the subject matter of Examples 13-15, wherein the overlapping pel forming elements in the first local group comprise first overlapping pel forming elements adjacent to the gap region and the pel forming elements in the second local group comprise second overlapping pel forming elements adjacent to the first overlapping pel forming elements.

Some embodiments pertain to Example 17 that includes at least one computer readable medium having instructions stored thereon, which when executed by one or more processors, cause the processors to generate first and second sets of inverse transfer functions to compensate for a gap region, wherein each set of inverse transfer functions is generated for a corresponding group of overlapping pel forming elements based on ink deposition functions associated with the corresponding group and a joint target response; wherein the gap region is located between overlapping pel forming elements of the corresponding groups and generate compensated halftones based on the first and second sets of inverse transfer functions.

Example 18 includes the subject matter of Example 17, wherein the compensated halftones are generated by applying the first and second sets of inverse transfer functions to an uncompensated halftone design to modify halftone thresholds of the uncompensated halftone design.

Example 19 includes the subject matter of Examples 18 and 19, wherein generating the first and the second sets of inverse transfer functions comprises generating the first set of inverse transfer functions based on first ink deposition functions and third ink deposition functions and generating the second set of inverse transfer functions based on second ink deposition functions and the third ink deposition functions; wherein the first ink deposition functions correspond to a first local group of pel forming elements including first overlapping pel forming elements, the second ink deposition functions correspond to a second local group of pel forming elements including second overlapping pel forming elements, and the third ink deposition functions correspond to the joint target response.

Example 20 includes the subject matter of Examples 17-19, wherein the overlapping pel forming elements in the first local group comprise first overlapping pel forming elements adjacent to the gap region and the pel forming elements in the second local group comprise second overlapping pel forming elements adjacent to the first overlapping pel forming elements.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:

at least one physical memory device to store compensation logic; and one or more processors coupled with the at least one physical memory device to execute the compensation logic to:

generate first and second sets of inverse transfer functions to compensate for a gap region, wherein each set of inverse transfer functions is generated for a corresponding group of overlapping pel forming elements based on ink deposition functions associated with the corresponding group and a joint ink deposition function target response; wherein the gap region is located between overlapping pel forming elements of the corresponding groups; and generate compensated halftones based on the first and second sets of inverse transfer functions.

2. The system of claim 1, wherein the compensated halftones are generated by applying the first and second sets of inverse transfer functions to an uncompensated halftone design to modify halftone thresholds of the uncompensated halftone design.

3. The system of claim 1, wherein generating the first and the second sets of inverse transfer functions comprises generating the first set of inverse transfer functions based on first ink deposition functions and third ink deposition functions and generating the second set of inverse transfer functions based on second ink deposition functions and the third ink deposition functions;

wherein the first ink deposition functions correspond to a first local group of pel forming elements including first overlapping pel forming elements, the second ink deposition functions correspond to a second local group of pel forming elements including second overlapping pel forming elements, and the third ink deposition functions correspond to the joint target response.

4. The system of claim 1, wherein the overlapping pel forming elements in the first local group comprise first overlapping pel forming elements adjacent to the gap region and the pel forming elements in the second local group comprise second overlapping pel forming elements adjacent to the first overlapping pel forming elements.

5. The system of claim 3, wherein generating the first, second and third ink deposition functions comprises generating a first Gaussian shaped ink deposition profile associated with the first local group, generating a second Gaussian shaped ink deposition profile associated with the second local group of pel forming elements and generating a third Gaussian shaped ink deposition profile associated with the joint target response.

6. The system of claim 5, wherein generating the first, second and third ink deposition functions further comprises combining the first, second and third Gaussian shaped ink deposition profiles.

7. The system of claim 1, wherein an ink deposition function further comprises a function of a pel forming element position and input digital count.

8. The system of claim 4, wherein the compensation logic applies the first and second sets of inverse transfer functions to generate fourth ink deposition functions, verifies whether a difference between the fourth ink deposition functions and large-scale ink deposition functions is within a predetermined threshold and validates an acceptable compensation upon determining that the difference is within the predetermined threshold.

9. The system of claim 1, further comprising a print engine comprising a plurality of pel forming elements.

10. The system of claim 1, wherein inverse transfer functions transform output digital counts, and the ink deposition functions represent output ink amount versus input digital count.

11. The system of claim 1, wherein each corresponding group has no overlapping pel forming element in common.

12. The system of claim 1, wherein each set of inverse transfer functions is generated based on weighted contributions to the joint target response.

13. A method comprising:

generating first and second sets of inverse transfer functions to compensate for a gap region, wherein each set of inverse transfer functions is generated for a corresponding group of overlapping pel forming elements based on ink deposition functions associated with the corresponding group and a joint ink deposition function target response; wherein the gap region is located between overlapping pel forming elements of the corresponding groups; and generating compensated halftones based on the first and second sets of inverse transfer functions.

14. The method of claim 13, wherein the compensated halftones are generated by applying the first and second sets of inverse transfer functions to an uncompensated halftone design to modify halftone thresholds of the uncompensated halftone design.

15. The method of claim 13, wherein generating the first and the second sets of inverse transfer functions comprises generating the first set of inverse transfer functions based on first ink deposition functions and third ink deposition functions and generating the second set of inverse transfer functions based on second ink deposition functions and the third ink deposition functions; wherein the first ink deposition functions correspond to a first local group of pel forming elements including first overlapping pel forming elements, the second ink deposition functions correspond to a second local group of pel forming elements including second overlapping pel forming elements, and the third ink deposition functions correspond to the joint target response.

16. The method of claim 13, wherein the overlapping pel forming elements in the first local group comprise first overlapping pel forming elements adjacent to the gap region and the pel forming elements in the second local group comprise second overlapping pel forming elements adjacent to the first overlapping pel forming elements.

17. At least one non-transitory computer readable medium having instructions stored thereon, which when executed by one or more processors, cause the processors to:

generate first and second sets of inverse transfer functions to compensate for a gap region, wherein each set of inverse transfer functions is generated for a corresponding group of overlapping pel forming elements based on ink deposition functions associated with the corresponding group and a joint ink deposition function target response; wherein the gap region is located between overlapping pel forming elements of the corresponding groups; and generate compensated halftones based on the first and second sets of inverse transfer functions.

18. The computer readable medium of claim 17, wherein the compensated halftones are generated by applying the first and second sets of inverse transfer functions to an uncompensated halftone design to modify halftone thresholds of the uncompensated halftone design.

19. The computer readable medium of claim 17, wherein generating the first and the second sets of inverse transfer functions comprises generating the first set of inverse transfer functions based on first ink deposition functions and third ink deposition functions and generating the second set of inverse transfer functions based on second ink deposition functions and the third ink deposition functions;

wherein the first ink deposition functions correspond to a first local group of pel forming elements including first overlapping pel forming elements, the second ink deposition functions correspond to a second local group of pel forming elements including second overlapping pel forming elements, and the third ink deposition functions correspond to the joint target response.

20. The computer readable medium of claim 17, wherein the overlapping pel forming elements in the first local group comprise first overlapping pel forming elements adjacent to the gap region and the pel forming elements in the second local group comprise second overlapping pel forming elements adjacent to the first overlapping pel forming elements.

* * * * *